United States Patent [19]

Randall

[11] Patent Number: 5,814,965
[45] Date of Patent: Sep. 29, 1998

[54] REDUCED NOISE CONTROLLER FOR A SWITCHED RELUCTANCE MACHINE

[75] Inventor: Steven Paul Randall, Leeds, United Kingdom

[73] Assignee: Switched Relutance Drives, Limited, Harrogate, United Kingdom

[21] Appl. No.: 706,554

[22] Filed: Sep. 5, 1996

[30] Foreign Application Priority Data

Sep. 14, 1995 [GB] United Kingdom .................. 9518837

[51] Int. Cl.$^6$ ....................................................... H02P 1/46
[52] U.S. Cl. ........................ 318/701; 318/138; 318/254; 318/439; 318/599; 318/800
[58] Field of Search .................................. 318/701, 138, 318/254, 439, 599, 800

[56] References Cited

U.S. PATENT DOCUMENTS

| Re. 34,609 | 5/1994 | Mueller ................................... 318/254 |
| 4,249,116 | 2/1981 | Hieda ...................................... 318/254 |
| 4,253,053 | 2/1981 | Ray et al. ............................... 318/701 |
| 4,427,910 | 1/1984 | Richter et al. .......................... 310/214 |
| 4,447,771 | 5/1984 | Whited ................................... 318/661 |

(List continued on next page.)

FOREIGN PATENT DOCUMENTS

| 0 557 811 A1 | 9/1993 | European Pat. Off. .......... H02P 6/02 |
| 0 655 835 A1 | 5/1995 | European Pat. Off. .......... H03K 7/08 |
| 4 036 565 A1 | 5/1992 | Germany ........................... H02P 8/00 |
| 3-089897 A | 4/1991 | Japan .................................. H02P 8/00 |
| 2 167 253 | 5/1986 | United Kingdom ............. H02P 6/00 |
| 2 167 910 | 6/1986 | United Kingdom ............. H02K 1/06 |
| WO 93/05564 | 3/1993 | WIPO ................................ H02P 6/02 |
| WO 94/28618 | 12/1994 | WIPO ................................ H02P 6/02 |

OTHER PUBLICATIONS

Frede Blaabjerg and John K. Pedersen, "Digital Implemented Random Modulation Strategies for AC and Switched Reluctance Drives," *Proceedings of the IECON'93*, pp. 676–682, International Conference on Industrial Electronics, Control and Instrumentation, Maui, Hawaii, Nov. 15–19, 1993.

Richard S. Wallace and David G. Taylor, "A Balanced Commutator for Switched Reluctance Motors to Reduce Torque Ripple," *IEEE Transactions on Power Electronics*, vol. 7, No. 4, pp. 617–626, Oct. 1992.

Richard S. Wallace and David G. Taylor, "Low–Torque–Ripple Switched Reluctance Motors for Direct–Drive Robotics," *IEEE Transactions on Robotics and Automation*, vol. 7, No. 6, pp. 733–742, Dec. 1991.

Richard S. Wallace, Jr. "Design and Control of Switched Reluctance Motors to Reduce Torque Ripple," Georgia Institute of Technology, Nov. 1990.

European Search Report dated June. 19, 1997 for corresponding European patent application 96306280.7.

(List continued on next page.)

*Primary Examiner*—Karen Masih
*Attorney, Agent, or Firm*—Arnold, White & Durkee

[57] ABSTRACT

A reduced vibration and reduced noise controller for a switched reluctance machine system and a method for reducing unwanted vibration and noise produced by a switched reluctance machine system. The energization of the voltage across a phase winding in the switched reluctance machine is controlled such that the voltage across the phase winding varies over time in a controlled manner from a first voltage level to a second voltage level following a predefined switching event. The control of the transition of the voltage across the phase winding from the first voltage level to the second voltage level is accomplished through application of a succession of timed voltage pulses to the phase winding at a fixed point in time after the predefined switching event or through use of a capacitor smoothing circuit.

29 Claims, 14 Drawing Sheets

U.S. PATENT DOCUMENTS

| | | | |
|---|---|---|---|
| 4,488,101 | 12/1984 | Studtmann | 318/800 |
| 4,500,824 | 2/1985 | Miller | 318/701 |
| 4,520,302 | 5/1985 | Hill et al. | 318/701 X |
| 4,661,756 | 4/1987 | Murphy et al. | 318/701 |
| 4,670,696 | 6/1987 | Byrne et al. | 318/701 |
| 4,691,038 | 9/1987 | MacMinn | 318/696 |
| 4,712,050 | 12/1987 | Nagasawa et al. | 318/254 |
| 4,731,570 | 3/1988 | Lee | 318/701 X |
| 4,761,580 | 8/1988 | Hein et al. | 310/214 |
| 4,849,873 | 7/1989 | Vanderhelst | 262/55 |
| 4,859,921 | 8/1989 | Archer | 318/599 |
| 4,868,477 | 9/1989 | Anderson et al. | 318/696 |
| 4,933,621 | 6/1990 | MacMinn et al. | 318/696 |
| 4,943,760 | 7/1990 | Byrne et al. | 318/701 |
| 5,072,166 | 12/1991 | Ehsani | 318/696 |
| 5,075,610 | 12/1991 | Harris | 318/701 X |
| 5,119,000 | 6/1992 | Schultz | 318/254 |
| 5,124,607 | 6/1992 | Rieber et al. | 310/214 |
| 5,144,209 | 9/1992 | Ingji et al. | 318/254 |
| 5,196,775 | 3/1993 | Harris et al. | 318/638 |
| 5,239,217 | 8/1993 | Horst | 310/51 |
| 5,296,785 | 3/1994 | Miller | 318/701 X |
| 5,343,105 | 8/1994 | Sakabe et al. | 310/179 |
| 5,373,206 | 12/1994 | Lim | 318/701 X |
| 5,446,359 | 8/1995 | Horst | 318/701 |
| 5,461,295 | 10/1995 | Horst | 318/701 |
| 5,589,752 | 12/1996 | Iwasaki et al. | 318/701 |

OTHER PUBLICATIONS

European Search Report dated Jul. 29, 1997 for corresponding European patent application 96306280.7.

Charles Pollock and Barry W. Williams, "A Unipolar Converter for a Switched Reluctance Motor," *Conference Record of the 1988 IEEE Industry Applications Society Annual Meeting*, pp. 44–49, Pittsburg, Pennsylvania, Oct. 2–7, 1988.

C. Y. Wu and C. Pollock, "Analysis and Reduction of Vibration and Acoustic Noise in the Switched Reluctance Drive," *IEEE Transactions on Industry Applications*, vol. 31, No. 1 pp. 91–98, Jan./Feb. 1995.

F. Blaabjerg et al., "Investigation and Reduction of Acoustical Noise from Switched Reluctance Drives in Current and Voltage Control," Sep. 5–71994, Proc. ICEM '94, pp. 589–594.

C. Y. Wu and C. Pollock, "Analysis and Reduction of Vibration and Acoustic Noise in the Switched Reluctance Drive," 1993, Proceedings of the IAS '93, pp. 106–113.

S. Chan et al., "Performace Enhancement of Single–Phase Switched–Reluctance Motor by DC Link Voltage Boosting," Sep. 1993, IEEE Proceedings–B, vol. 140, pp. 316–322.

Stephenson and Blake, "The Characteristics, Design and Applications of Switched Reluctance Motors and Drives," PCIM Conference & Exhibition, Jun. 21–24, 1993, Nuremberg, Germany.

D. E. Cameron et al., "The Origin and Reduction of Acoustic Noise in Doubly Salient Variable–Reluctance Motors," Nov./Dec. 1992, IEEE Transactions on Industry Applications, vol. 28 No. 6, pp. 1250–1255.

Shi–Ping Hsu et al., "Modeling and Analysis of Switching DC–to–DC Converters in Constant–Prequency Current–Programmed Mode," 1979, IEEE Power Electronics Specialists Conference, pp. 284–301.

REDUCED NOISE CONTROLLER FOR A SWITCHED RELUCTANCE MACHINE

CROSS-REFERENCE TO RELATED APPLICATIONS

This application is related to U.S. patent application Ser. No. 08/709,474, entitled REDUCED NOISE CONTROLLER FOR A SWITCHED RELUCTANCE MACHINE USING ACTIVE NOISE CANCELLATION (Atty. File EMER:011) filed the same date as this application, by the same inventor, the disclosure of which is hereby incorporated by reference.

FIELD OF THE INVENTION

This invention relates to reluctance machine systems and more particularly to systems utilizing switched reluctance machines. In particular, the present invention relates to a method and apparatus for reducing acoustic noise, unwanted vibrations, and iron losses in switched reluctance machine systems.

BACKGROUND OF THE INVENTION

In general, a reluctance machine is an electric machine in which torque is produced by the tendency of its movable part to move into a position where the inductance of an excited winding is maximized.

In one type of reluctance machine the energization of the phase windings occurs at a controlled frequency. These machines are generally referred to as synchronous reluctance machines. In a second type of reluctance machine, circuitry is provided for detecting the angular position of the rotor and energizing the phase windings as a function of the rotor's position. This second type of reluctance machine is generally known as a switched reluctance machine. Although the description of the present invention is in the context of a switched reluctance machine, the present invention is applicable to all forms of reluctance machines, including synchronous and switched reluctance motors, synchronous and switched reluctance generators, as well as to other machines that have phase winding arrangements similar to those of switched reluctance machines.

The general theory of design and operation of switched reluctance machines is well known and discussed, for example in *The Characteristics, Design and Applications of Switched Reluctance Motors and Drives,* by Stephenson and Blake and presented at the PCIM '93 Conference and Exhibition at Nürenberg, Germany, Jun. 21–24, 1993.

FIG. 1 illustrates an exemplary switched reluctance machine having a stator 10 including six projecting stator poles 11–16 that define a principal stator axis (extending outwardly from FIG. 1). A rotor 18 is coupled to a rotatable shaft co-axial with the principal axis of the stator. In FIG. 1, the rotor is positioned within the bore formed by the stator and the inwardly pointing stator poles 11–16 and is mounted on a shaft (not shown) that is mounted on bearings and is free to rotate. The rotor 18 has a number of outwardly extending projections 19 which form the rotor poles.

Associated with each stator pole is a wound coil of wire 17. In the illustrated machine, the two coils of opposing stator poles are coupled together to form three phases: phase A (coils from poles 11 and 14); phase B (coils from poles 12 and 15); and phase C (coils from poles 13 and 16). In the example illustrated in FIG. 1, when phase A is energized, electric current will flow through its coils such that stator pole 11 becomes, for example, an inward-pointing electromagnet of positive polarity and stator pole 14 becomes an inward-pointing electromagnet of negative polarity. These electromagnets will produce a force of attraction between the energized stator poles and the rotor poles which will produce a torque. By switching energization from one phase to another, the desired torque may be maintained regardless of the angular position of the rotor. By switching the energization of the phase windings to develop positive torque, the machine may be operated as a motor; by energization of the phase windings to develop a retarding torque the machine may be operated as a brake or generator.

For the sake of illustration, a simple form of machine having six stator poles and two rotor poles (i.e. a 6/2 machine) is shown. Those skilled in the art will recognize that other combinations are possible. The present invention applies equally to such machines. Moreover, the present invention is applicable to inverted machines, where the stator is positioned within the bore of an outer rotating rotor, and to linear machines, where the movable member moves linearly with respect to the stator. In the art the movable member of a linear machine is also commonly referred to as a rotor.

When a switched reluctance machine is running, the torque (and other machine performance parameters) may be adjusted by monitoring the rotor's position, energizing one or more phase windings when the rotor is at a first angular position, referred to as the "turn-on angle," and then de-energizing the energized windings when the rotor rotates to a second angular position, referred to as the "turn-off angle." The angular distance between the turn-on angle and the turn-off angle is known as the "conduction angle."

At standstill and at low speeds, the torque of a switched reluctance machine can be controlled by varying the current in the energized phases over the period defined by the turn-on and turn-off angles. When current chopping is used such current control can be achieved by chopping the current using a current reference with phase current feedback. Such current control is referred to as "chopping mode" current control. Alternately, pulse width modulation (PWM) voltage control may be used. Chopping mode current control and PWM control strategies are generally understood and chopping mode current control is generally described below.

FIG. 2A generally illustrates an exemplary current in a phase winding when chopping mode current control is used when the switched reluctance machine is operating as a motor. As is illustrated in FIG. 2A, the phase is initially energized at a point corresponding to the turn-on angle and current begins to increase until it reaches the current reference. At that point, the current is chopped by a controller, de-energizing the phase winding. The current drops until the phase winding is again re-energized and the process repeats. As indicated in FIG. 2A, in the chopping mode, the overall shape of the current waveform defines a substantially rectangular region where the beginning and end points of the rectangular region generally correspond to the turn-on and turn-off angles.

As the angular speed of the motor increases, a point is reached where there is insufficient time for more than a single pulse of current to occur during each phase period. Accordingly, at these speeds pulse width modulation or chopping strategies are ineffective. At these speeds, the torque of the motor is commonly controlled by controlling the position and duration of the voltage pulse applied to the winding during the phase period. Because a single pulse of voltage is applied during each phase period, this form of control is referred to as "single-pulse control."

FIG. 2B illustrates an exemplary current waveform for a phase current in a switched reluctance motor operating in the single-pulse mode. In the single-pulse mode, the torque level is defined by the magnitude and shape of the current pulse which, in turn, is determined by: the angular speed of the rotor; the point during the rotor's rotation when voltage is applied to the phase winding (i.e., the turn-on angle); the point during the rotor's rotation when the application of voltage to the winding is halted (the turn-off angle); and, the magnitude of the voltage applied to the phase winding. FIG. 2B generally illustrates the approximate positions of the turn-on and turn-off angles and the duration of the conduction angle for the exemplary waveform.

FIG. 3 generally illustrates power circuitry that may be used to control the energization of a phase winding for both "chopping mode" and "single-pulse mode" current control.

Referring to FIG. 3, a phase winding 30 is coupled to a source of DC power provided through a DC bus, comprising positive rail 31 and negative rail 32, by upper switching device 33 and lower switching device 34. Return diodes 35 and 36 are provided to provide a current path from the DC bus through the phase winding 30 when switching devices 33 and 34 are opened. As those skilled in the art will appreciate, phase winding 30 is generally energized by closing switches 33 and 34, thus coupling the phase winding to the DC bus.

The circuit illustrated in FIG. 3 may be used to implement chopping mode current control as follows: When the rotor reaches an angular position that corresponds to the turn-on angle, switches 33 and 34 are closed. The phase winding 30 is then coupled to the DC bus, causing an increasing magnetic flux to be established in the motor. It is the magnetic field associated with this flux which acts on the rotor poles to produce the motor torque. As the magnetic flux in the machine increases, current flows from the DC supply as provided by the DC bus through the switches 33 and 34 and through the phase winding 30.

The current flowing through the phase winding 30 is sensed by a current sensor or other device (not shown) that provides a signal corresponding to the magnitude of the phase current. The signal corresponding to the phase current is then compared to a signal representing a reference current. When the actual current in the phase winding exceeds the reference current, the phase winding is de-energized, by opening one or both of switches 33 and 34. When both switches 33 and 34 are opened, the current in phase winding 30 transfers from switches 33 and 34 and begins to flow through diodes 35 and 36. The diodes 35 and 36 then apply the DC voltage appearing on the DC bus in the opposite sense, causing the magnetic flux in the machine (and therefore the phase current) to decrease. When the current decreases below the reference current by a predetermined value, the phase is re-energized and the current again begins to increase.

The process of energizing the phase winding 30, de-energizing it when the phase current exceeds the reference current, and re-energizing it when the phase current drops below the reference current by a predetermined value, repeats itself during the interval defined by the turn-on and turn-off angles. Typically, when the rotor reaches an angular position corresponding to the turn-off angle, switches 33 and 34 are opened, and the phase current is allowed to drop to zero. At that point the diodes 35 and 36 turn off, disconnecting the phase winding from the power supply.

As those skilled in the art will appreciate, the above discussion of current control is but one example of a chopping mode current strategy that may be used and that alternate strategies, e.g., strategies including freewheeling, may also be used.

The circuit illustrated in FIG. 3 may be also used to implement single-pulse mode current control. When the motor is operating in the single-pulse mode, the control strategy is fairly straightforward. When the rotor reaches an angular position that corresponds to the turn-on angle, switches 33 and 34 are closed. The phase winding 30 is then coupled to the DC bus, causing an increasing magnetic flux to be established in the motor. As the magnetic flux in the machine increases, current flows from the DC supply as provided by the DC bus through the switches 33 and 34 and through the phase winding 30. When the rotor reaches an angular position corresponding to the turn-off angle, switches 33 and 34 are opened and the current in phase winding 30 transfers from switches 33 and 34 and begins to flow through diodes 35 and 36. As in the chopping mode, diodes 35 and 36 then apply the DC voltage appearing on the DC bus in the opposite sense, causing the magnetic flux in the machine (and therefore the phase current) to decrease. Again, the above description is but one example of how the circuitry of FIG. 3 may be used to implement single-pulse mode current control. Alternate strategies, such as strategies employing freewheeling, may also be used.

The inherently inductive nature of a phase winding can lead to problems with transient voltages in the form of spikes when switching a voltage across the winding. These spikes have a much larger peak magnitude than the switched voltage and a very high rate of increase and decrease. The magnitude of the voltage can damage the switch element. To counter this it is known to use a so-called 'snubber' circuit connected across the switch to suppress the transient voltage spikes in the switch.

In known snubber circuits the rate of increase and decrease in the voltage transient is typically suppressed without affecting appreciably the responsiveness of the switch to swing to the new voltage level imposed on the phase winding as a result of switching. In most instances, the suppression of voltage spikes through the use of such snubber circuits is achieved without imposing more than a 5 microsecond transition time on the switched voltage.

As the above discussion indicates, as a switched reluctance motor (or generator) operates, magnetic flux is continuously increasing and decreasing in different parts of the machine. This changing flux will occur in both chopping mode and single-pulse current control. The changing flux results in fluctuating magnetic forces being applied to the ferromagnetic parts of the machine. These forces can produce unwanted vibration and noise. One major mechanism by which these forces can create noise is the ovalizing of the stator caused by forces normal to the air-gap. Generally, as the magnetic flux increases along a given diameter of the stator, the stator is pulled into an oval shape by the magnetic forces. As the magnetic flux decreases, the stator springs back to its undistorted shape. This ovalizing and springing back of the stator can cause unwanted vibration and produce audible noise.

In addition to the distortions of the stator by the ovalizing magnetic forces, unwanted vibration and acoustic noise may also be produced by abrupt changes in the magnetic forces in the motor. These abrupt changes in the gradient of the magnetic flux (i.e., the rate of change of the flux with time) are referred to as "hammer blows" because the effect on the stator is similar to that of a hammer strike. Just as a hammer strike may cause the stator to vibrate at one or more natural frequencies (determined by the mass and elasticity of the stator) the abrupt application or removal of magnetic force can cause the stator to vibrate at one or more of its natural frequencies. In general, the lowest (or fundamental) natural frequency dominates the vibration, although higher harmonics may be emphasized by repeated excitation at the appropriate frequency.

In addition to the stator distortions resulting from the ovalizing and hammer blow phenomena described above, the fluctuating magnetic forces in the motor can distort the stator in other ways, as well as distorting the rotor and other ferromagnetic parts of the machine system. These additional distortions are another potential source of unwanted vibration and noise.

Although the problem of unwanted acoustic noise and vibration has been recognized, known control systems for reluctance motors do not adequately solve the problem. For example, the general problem of acoustic noise in switched reluctance motor systems is discussed in C. Y. Wu and C. Pollock, "Analysis and Reduction of Vibration and Acoustic Noise in the Switched Reluctance Drive," *Proceedings of the IAS* '93 pp. 106–113 (1993). In general, the method suggested by Wu and Pollock involves control of the current in the phase winding such that the current is controlled in two successive switching steps with the second switching step occurring approximately one-half of a resonant cycle after the first where the resonant cycle is defined by the natural frequency of the machine. This approach is typically implemented by switching off one of the power devices at a first point in time to cause a first stepped reduction in applied voltage, and then later switching off the second power device. Between the time when the first switching device is switched off and the second switching device is switched off, the current is allowed to freewheel through a freewheeling diode and the second switching device.

The two-step voltage-reduction approach to noise reduction in switched reluctance motors discussed above suffers from several limitations and disadvantages. One such limitation is that in many cases the two-step voltage-reduction approach requires precise switching of the switching devices within the interval defined by the turn-on and turn-off angles (i.e., the angular interval during which the phase winding is energized). Still further, the two-step voltage-reduction approach limits the flexibility to dynamically adjust the freewheeling period for each phase cycle. As discussed above, in the two-step voltage-reduction approach, the duration of the freewheeling period is optimized to reduce the noise produced by the system. There are many instances when it would be desirable to optimize the freewheeling duration according to other criteria.

An additional limitation of the two-step voltage-reduction approach, and other approaches that utilize freewheeling to reduce noise, is that, since there is typically only one freewheeling period per phase energization cycle, freewheeling generally reduces noise produced by only a single frequency of the motor system. Freewheeling to reduce noise at one frequency does not necessarily reduce noise produced by other frequencies in motor systems that have more than one frequency. Accordingly, such approaches do not reduce many sources of unwanted noise or the amplitude of the frequencies at which unwanted noise is produced. A further disadvantage with the freewheeling approaches is that there are several motor control systems (e.g., H-circuits with a split capacitor, third-rail circuits, ring circuits and the like) that simply do not allow freewheeling. These systems cannot use freewheeling to reduce noise.

The present invention overcomes many of the limitations and disadvantages associated with known systems and provides a unique method and apparatus for energizing the winding phases of a switched reluctance motor in a particular manner to reduce unwanted noise and vibrations produced by the motor.

SUMMARY OF THE INVENTION

As discussed above, in known switched reluctance machine systems, abrupt changes in the gradient of the magnetic flux in the machine tend to cause unwanted acoustic noise and vibration. In one embodiment of the present invention, a control circuit for a reluctance machine controls the energization of the phase windings such that there are no abrupt changes in the gradient of the magnetic flux in the motor. Transitions of the voltage across the phase winding occur over a predefined period of time. This damping of the voltage transitions renders the change in the gradient of the magnetic flux in the machine less abrupt, thus reducing the unwanted vibrations and noise associated with the machine.

In accordance with one form of the present invention, one or more capacitor smoothing circuits are utilized to smooth the voltage transitions. These capacitor smoothing circuits may be positioned in a converter for a switched reluctance machine to control the transition of the voltage across the phase winding.

In accordance with another form of the present invention, a succession of timed voltage pulses are applied to the phase winding of a switched reluctance machine at a fixed point in time following a predefined switching event. The succession of timed voltage pulses controls the voltage across the phase winding of the switched reluctance machine such that the average voltage across the phase winding smoothly varies from a first voltage level to a second voltage level over a given time period.

BRIEF DESCRIPTION OF THE DRAWINGS

Other aspects and advantages of the present invention will become apparent upon reading the following detailed description and upon reference to the drawings in which.

Similar reference characters indicate similar parts throughout the several views of the drawings.

DETAILED DESCRIPTION OF THE INVENTION

Figure 1:
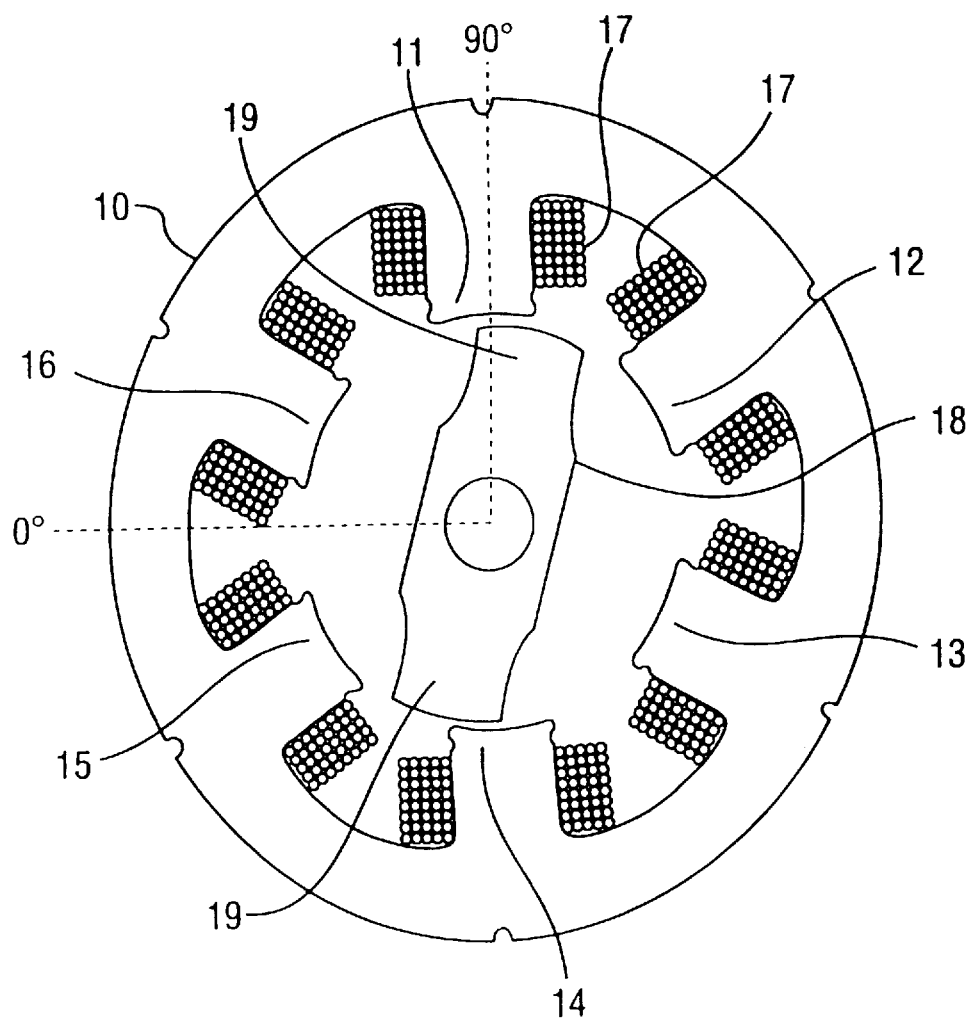
FIG. 1 illustrates an exemplary reluctance motor having a stator including six stator poles.
Figure 2A:
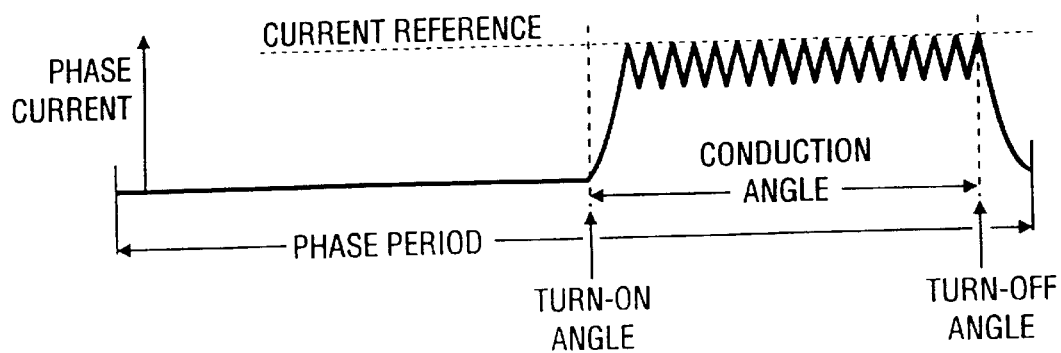
FIG. 2A generally illustrates an exemplary current in a phase winding of a switched reluctance motor when the current chopping mode of control is used.
Figure 2B:
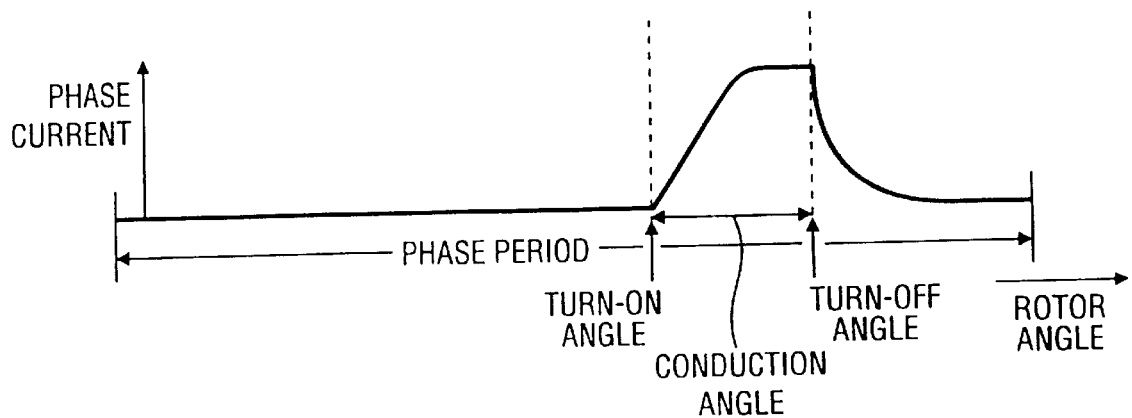
FIG. 2B generally illustrates an exemplary current waveform for a phase current in a switched reluctance motor operating in the single-pulse mode of control.
Figure 3:
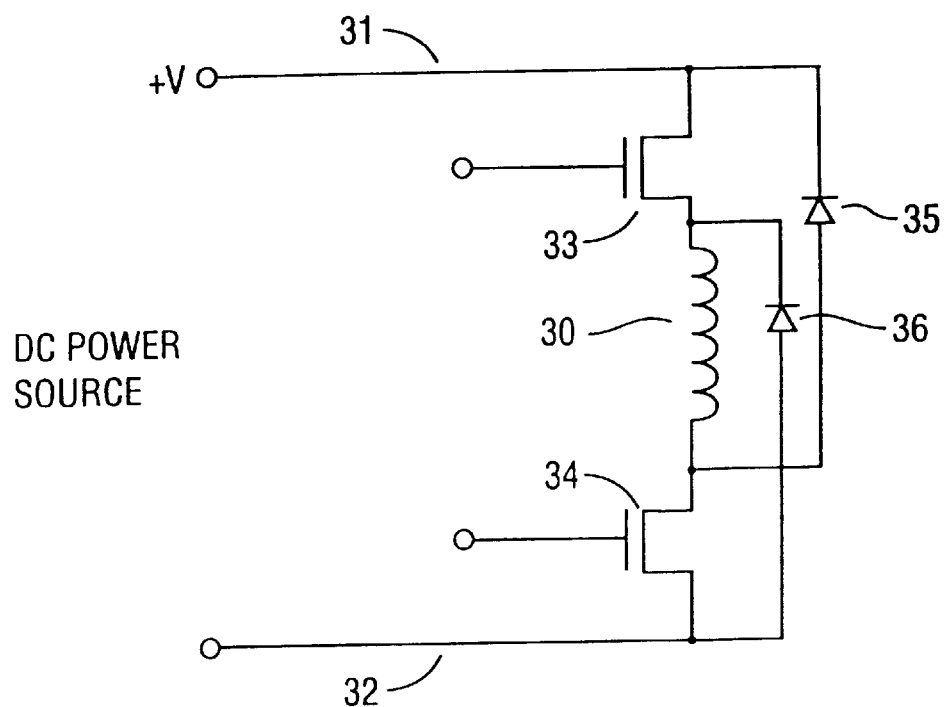
FIG. 3 generally illustrates power circuitry that may be used to control the energization of a phase winding of a switched reluctance machine for both chopping mode and single-pulse mode current control.
Figure 4:
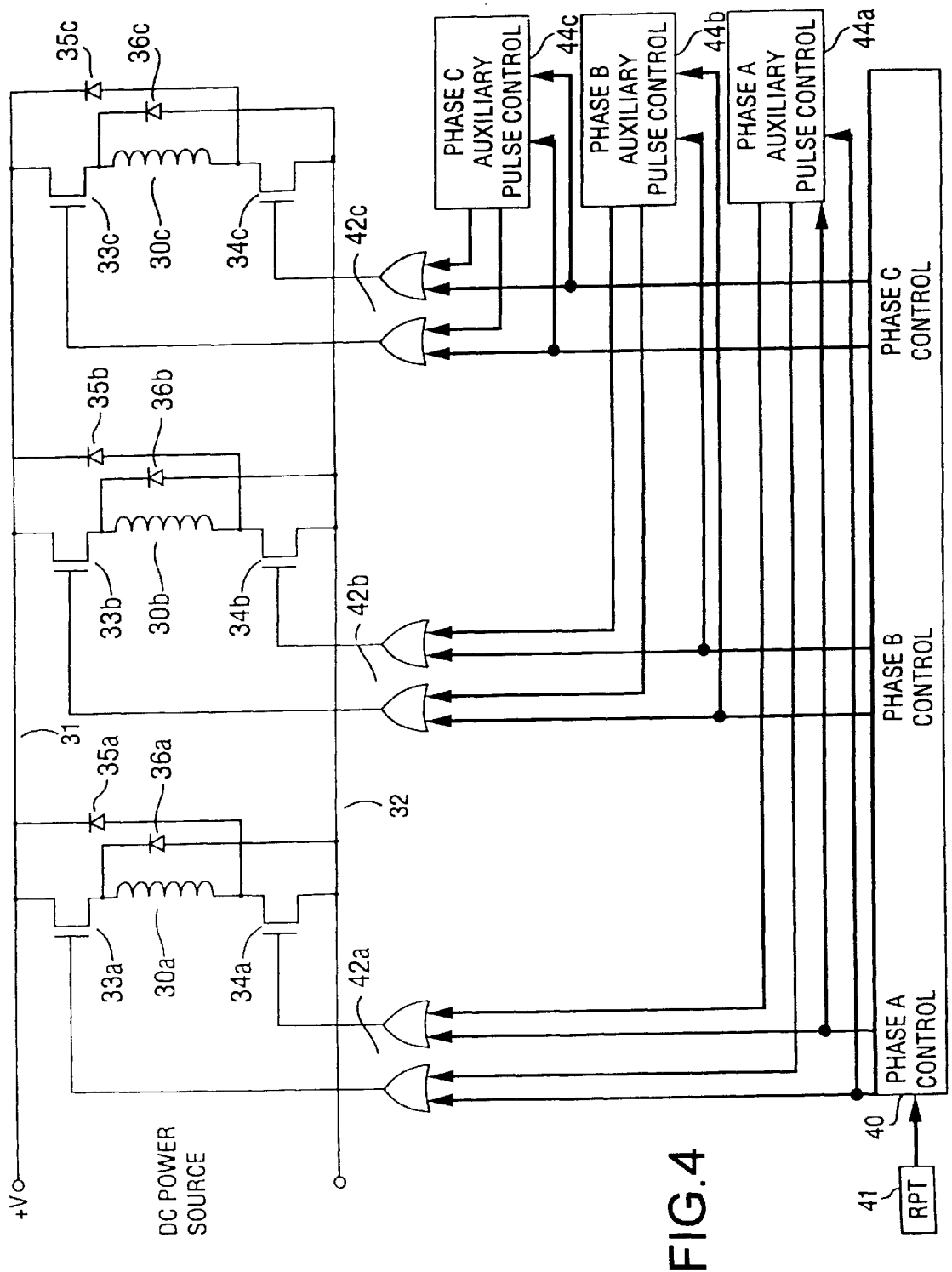
FIG. 4 illustrates in block form various components that may be used to construct a control system to implement the methods of the present invention.

Turning to the drawings and referring to FIG. 4, one example of a control system that may be used to implement the methods of the present invention is illustrated in block form. As illustrated, an electronic controller 40 receives signals from a rotor position transducer ("RPT") 41. The RPT 41 detects the angular position of the rotor and provides the controller 40 signals representative of the rotor's position. In response to the rotor position signals from RPT 41, the controller 40 provides switching signals (sometimes referred to as "firing signals") to a number of switching devices 33a–c and 34a–c. The switching devices 33a–c and 34a–c are connected to the three phase windings 30a, 30b and 30c of a three phase switched reluctance motor in a manner similar to that described above in connection with FIG. 3. The switching devices 33a–c, 34a–c may comprise MOSFETS, bipolar devices, or other switching devices. The switched reluctance motor may be of the type illustrated in FIG. 1. The windings of the motor are schematically illustrated by 30a–c. RPT 41 may comprise optical capacitive, inductive or magnetic sensors and may be of conventional construction. Embodiments are envisioned wherein the RPT is replaced by a position detector that monitors the electrical characteristics of the phase winding and provides a signal representative of the rotor's angular position without the use of position sensors.

In general, the electronic controller 40 responds to the position signals from RPT 41 by generating firing signals for each of the three phases 30a–c of the motor to switch the power devices 33a–c and 34a–c such that the phase windings 30a–30c are energized in the proper sequence over angular periods of rotor rotation to produce torque in a desired direction.

The operation of controller 40 is not critical to the present invention and may be of conventional construction. Controllers for switched reluctance motors that produce firing signals in response to rotor position signals are generally known in the art and are not discussed in detail. One of ordinary skill in the art having the benefit of this disclosure will be able to construct a suitable controller. Moreover, the precise construction of the switched reluctance motor and the arrangement of the switching devices 33a–c and 34a–c are not critical to the present invention. The methods of the present invention are generally applicable to switched reluctance motor controllers.

The firing signals from controller 40 are applied to six pairs of OR gates 42a–c. Each pair of OR gates 42a–c is associated with one of the three phases of the motor. The outputs of the OR gates 42a–c are provided to the gates of the power switching devices 33a–c and 34a–c. During normal operation, the controller 40 operates according to known methods to produce firing signals for the power switching devices 33a–c and 34a–c. The firing signals are passed through the appropriate OR gates 42a–c and are used to control the energization and de-energization of phase windings 30a–c over angular periods of the rotor's rotation and thus control the torque of the motor.

Associated with each set of OR gates 42a–c is an auxiliary pulse control circuit 44a–c. As discussed more fully below, the auxiliary pulse control circuits 44a–c monitor the firing signals applied to OR gates 42a–c and generate auxiliary pulse signals to implement the noise reduction methods of the present invention. These auxiliary pulse signals are passed through the appropriate OR gate 42 and are applied to the power devices 33a–c and 34a–c such that the phase windings are energized in response to the auxiliary pulse signals. In accordance with one embodiment of the present invention these auxiliary pulses control the energization of the phase winding such that unwanted vibrations and noise are reduced.

As discussed above, abrupt changes in the gradient of the magnetic flux tend to impose distorting forces on the stator causing acoustic noise and unwanted vibrations. The switching points of the power devices that occur when the flux, and therefore the magnetic forces, are the greatest, are the switching points most closely related to the amount of unwanted noise and vibration produced by the motor. In general, the point at which the flux is the greatest will be at a switch-off point (e.g., a point when both switching devices are opened). Typically, the switch-off point where the flux is the greatest for a given phase winding is the switch-off point that occurs when the greatest number of volt-seconds have been applied to the phase winding. In general the switch-off point will be defined by a predefined switching event. Such an event can, for example, correspond to the opening of the upper and lower switching devices or the opening or closing of only one switching device.

When single-pulse control is used, the switch-off point that occurs at maximum flux is easily determined since the only switch-off point during each phase energization cycle occurs at the end of the single pulse. In chopping mode, however, there may be several switch-off points, each occurring when the switches are opened to control the level of the phase current. In general, when the machine is running as a motor, the switch-off point that occurs last in time for each phase energization period is the most significant and it is at that point that the method of the present invention may be applied to reduce noise and vibration. When a machine is running as a generator, the first switching point is generally the most significant, since the first switching point in generators generally occurs at the point of greatest flux.

Figure 5A:
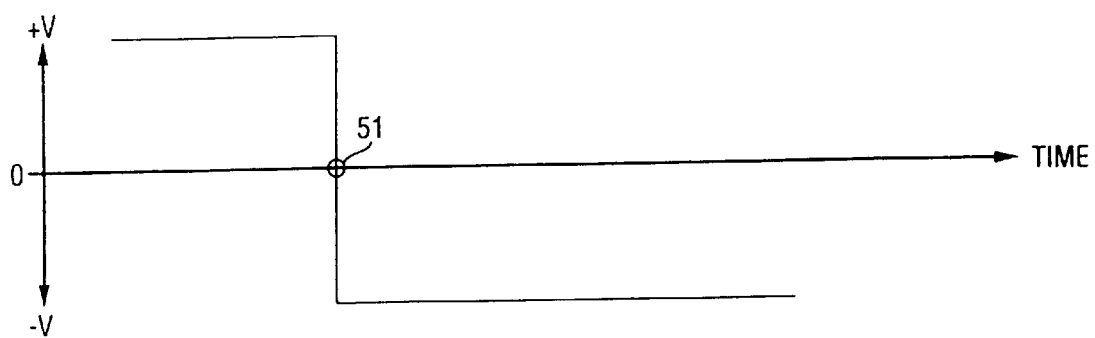
FIG. 5A generally illustrates an example of the voltage applied to a phase winding of switched reluctance motor before and after a typical switch-off point.
Figure 5B:
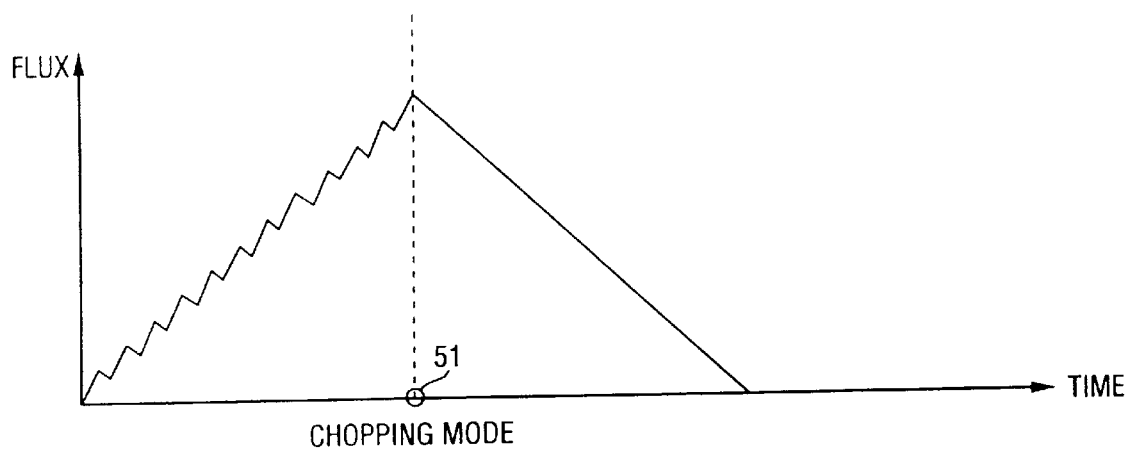
FIGS. 5B and 5C respectively illustrate examples of the flux that may exist in a motor before and after the switch-off point of FIG. 5A for chopping mode and single-pulse mode current control.
Figure 5C:
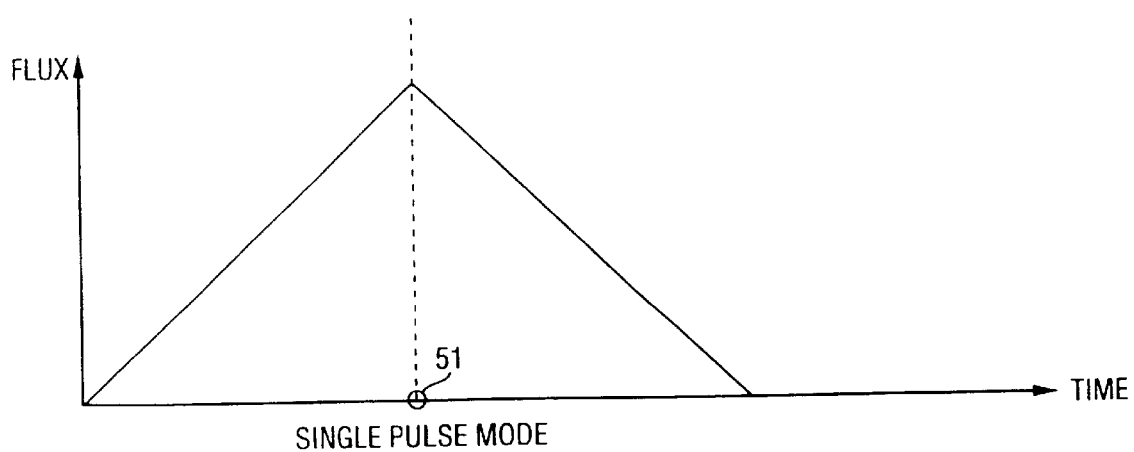

The general relationship between the switch-off point of interest and abrupt changes in the gradient of the magnetic flux is illustrated in FIGS. 5A–5C. FIG. 5A generally illustrates an example of the voltage applied to a winding of switched reluctance motor before and after a typical switch-off point. The switch-off point 51 of FIG. 5A may represent the switch-off point of interest for a motor operating in either chopping or single-pulse mode. As discussed generally above, prior to the switch-off 51 point the DC voltage from the DC supply bus is applied to the phase winding through at the switching devices such that the voltage across the phase winding is +V, where V is the magnitude of the DC supply. At the switching point 51 the switches are opened and the +V voltage applied through the switches is reversed and a -V voltage is applied to the phase windings through the diodes.

FIGS. 5B and 5C generally illustrate examples of the flux that may exist in a motor before and after the switch-off point 51 of FIG. 5A. FIG. 5B generally illustrates the flux that may exist in the motor when chopping mode current control is used and FIG. 5C generally illustrates the flux that may exist in the motor when single-pulse mode current control is used. FIGS. 5B and 5C are not drawn to the same time scale as FIG. 5A. It should be noted that the flux curves of FIGS. 5B and 5C have been exaggerated to some extent and are provided for illustrative purposes only. They are not intended to reflect accurately and exactly the flux in a reluctance machine.

Referring to FIG. 5B, prior to switch-off point 51, the flux in the motor varies as the switching devices are chopped on and off, but generally increases from a point corresponding to the turn-on angle until the switch-off point 51, which corresponds to the turn-off angle, at which point the gradient of the magnetic flux in the machine abruptly changes and begins to drop off dramatically. In a similar manner, when single-pulse mode current control is used, the flux in the motor will increase from a point corresponding to the turn-on angle to the switch-off point 51, at which point the gradient of the flux will change abruptly and the flux begin to decrease. It may be noted from FIGS. 5A–5C, therefore, that at the switch-off points of interest the change in the gradient of the magnetic flux in the machine is sharp and abrupt.

As generally discussed above, the abrupt changes in the gradient of the flux that occur at the switch-off point cause sudden changes in magnetic forces that tend to cause unwanted noise and vibration. In one embodiment of the present invention, these sudden changes are actively canceled through the application of the auxiliary voltage pulses. These auxiliary pulses are timed such that their effect is to produce vibrational forces in the machine system which tend to actively cancel the stator vibration that would otherwise be produced.

Referring to FIG. 4, when active canceling is used, auxiliary pulse controllers 44a–c receive as inputs the respective phase firing signals from controller 40 and provide auxiliary firing signals that are passed to the respective power switching devices via the pairs of OR gates 42a–42c. Auxiliary pulse controllers 44a–c monitor the firing signals and determine when the appropriate switch-off point for the respective phase has occurred. When the appropriate switch-off point for the respective phase is detected, the auxiliary pulse controller 44 then provides one or more timed voltage pulses that act as auxiliary firing signals to apply one or more auxiliary voltage pulses to the motor. These auxiliary pulses occur at a predetermined point in time following the switch off point and produce forces in the motor that actively cancel unwanted oscillations resulting from switch-off and can discriminately reduce the amount of unwanted noise.

Figure 6:
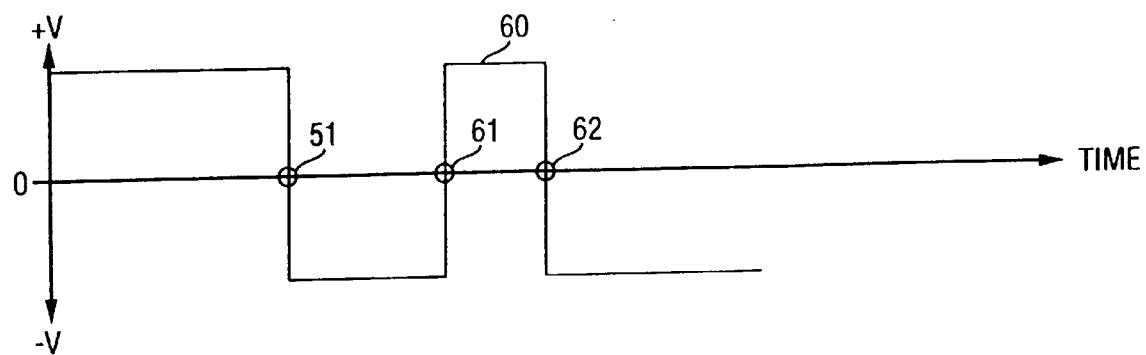
FIG. 6 generally illustrates one example of the voltage applied to a winding of switched reluctance motor before and after a typical switch-off point in one embodiment of the present invention.

The general concept of the present invention is illustrated by the voltage waveform illustrated in FIG. 6. FIG. 6 generally illustrates one example of the voltage applied to a phase winding of a switched reluctance motor before and after a typical switch-off point 51. As FIG. 6 illustrates, prior to switch-off point 51, the voltage applied to the winding is the +V voltage of the power supply. At the switch-off point 51, the +V voltage provided through the switching devices is removed and a -V voltage is applied through the diodes. According to the present invention, an auxiliary voltage pulse 60 defined by initiating point 61 and terminating point 62 is applied to the phase winding after switch-off point 51. In the embodiment of FIG. 4, this auxiliary voltage pulse may be provided by the appropriate auxiliary controller 44 providing auxiliary firing pulses to switch on the appropriate switching devices 33 and 34 for the duration of the auxiliary pulse.

Just as switching that occurs at switch-off point 51 produces an abrupt change in the gradient of the magnetic flux in the machine that has the effect of a hammer blow, the switching that occurs at initiating and terminating points of auxiliary pulse 60 also produces an abrupt change in the gradient of the magnetic flux in the machine that has the effect of an auxiliary hammer blow. Through proper timing of auxiliary pulse 60, the auxiliary hammer blow may be applied to the stator such that it effectively cancels (or significantly reduces) any vibration caused by the initial change. This effect may be understood by considering the auxiliary hammer blow as causing substantially the same vibration as the initial hammer blow but in anti-phase. The sum of these vibrations is therefore small, and the resulting vibration (and acoustic noise) is therefore reduced.

The precise number of auxiliary pulses and the timing of their application depend on the structure and particular geometry of the motor system of interest. Accordingly, it may be desirable to determine empirically how many auxiliary pulses should be applied and when. In general, however, for machines with only one natural frequency, one properly timed auxiliary pulse may be sufficient to significantly reduce unwanted vibration. For machines and structures with more than one natural frequency, more than one pulse may be required, with each timed to correspond to one of the natural frequencies.

Although the timing of the auxiliary pulse or pulses will depend on the particular machine of interest, the timing of the pulses may occur at a constant time interval after the switch-off point, regardless of the speed or torque output of the motor. This is because the timing and number of pulses is closely related to the natural frequencies of the motor, and the natural frequencies of the motor do not vary substantially with speed or torque output variations. Accordingly, the application of auxiliary pulses in accordance with this embodiment of the present invention is related to the length of time that has passed since the switch off point of interest, not to the angular position of the rotor. This is different from the application of an energizing voltage pulse to the motor which is generally initiated and terminated in response to the rotor position (e.g., the turn-ON and turn-OFF angles).

While the precise timing of the auxiliary pulses is generally best determined by empirical analysis of the motor of interest, some general guidelines can be provided. Because the nature of the present approach involves the generation of anti-phase hammer blows through the application of auxiliary voltage pulses, the simplest way to produce an anti-phase hammer blow is to cause an abrupt change in the gradient of the flux to occur approximately one resonant-frequency-half-cycle (or an odd integer multiple of such a half cycle) after the change in flux that produces the original hammer blow for each significant resonant frequency of the motor. Because the natural frequencies of the reluctance machine will not substantially change with the speed and torque output of the machine, the timing of the auxiliary pulses can be set and does not have to vary with the speed of the rotor. In general, the stiffer the stator, the higher the natural frequency and the faster the auxiliary pulse(s) must be applied to cancel the unwanted vibration effectively.

Figure 7:
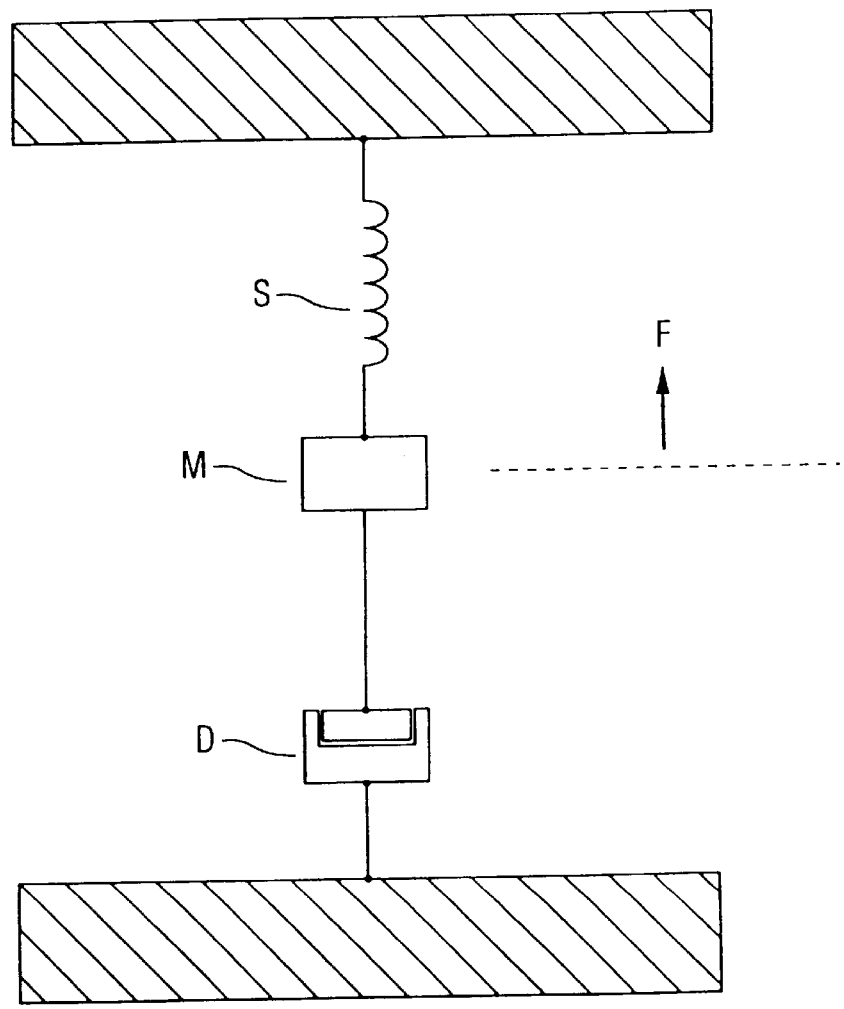
FIG. 7 illustrates a model of a switched reluctance motor system in the form of as a spring-mass system with damping.

One natural frequency of the machine will correspond roughly to the natural frequency at which the stator back-iron vibrates under the influence of an abrupt change in the magnetic forces in the motor. To analyze the natural frequency of the stator back-iron, it may be helpful to model the machine as a spring-mass system with damping. Such a model is generally illustrated in FIG. 7 where element S represents a spring having a stiffness in terms of $kg/s^2$ or N/m, element M represents the mass of the system in kg (principally the stator pole mass), and element D represents a damping element having a damping effect in terms of kg/s or N/m/s. Using a calculated stator pole mass as a nominal figure for element M, the appropriate spring stiffness S and damping factor D may be calculated from measured accelerometer data. Also shown in FIG. 7 is a reference line 70 that may be used to determine the relative deflection of the mass member M and a force line F, showing the direction of positive force.

Figure 8:
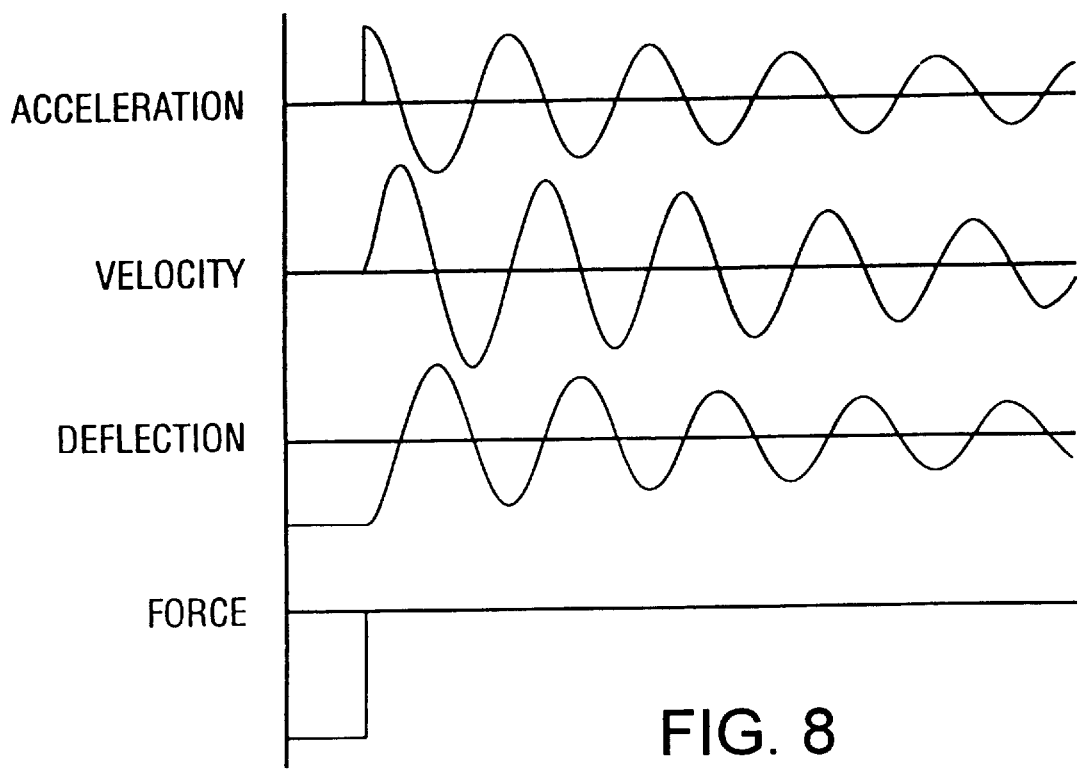
FIG. 8 generally illustrates the effect of a sudden release of negative force on the system of FIG. 7.

FIG. 8 generally illustrates the effect of a sudden release of negative force on the system of FIG. 7. In a switched reluctance motor this generally corresponds to the release of force that occurs when there is a rapid change in the flux gradient, allowing an ovalized stator to spring back to its original shape. The lower curve in FIG. 8 illustrates an abrupt change in force from approximately −1500 Newtons to zero. From the bottom up, the curves above the Force curve represent the Deflection, Velocity and Acceleration of the system over time from a set reference point. As FIG. 8 indicates, when an applied force is abruptly removed from the system the system will accelerate upwards initiating classical damped harmonic motion. In a motor system, the oscillation indicated by FIG. 8 represents the unwanted vibrations which often produce unwanted noise.

Figure 9:
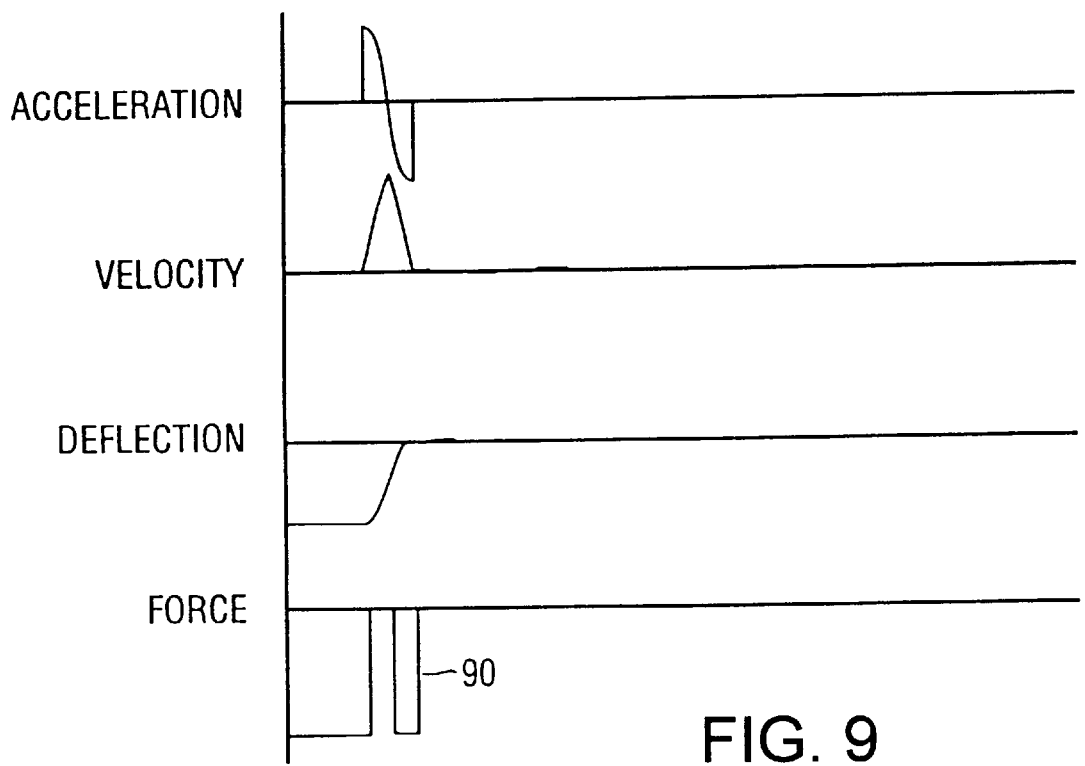
FIG. 9 generally illustrates how the method of the present invention may be used to reduce unwanted vibration in the system of FIG. 7 through the application of one or more auxiliary pulses.

FIG. 9 generally illustrates how the method of the present invention may be used to reduce unwanted vibration in the system of FIG. 7 through the application of one or more auxiliary pulses. FIG. 9 shows the use of an auxiliary pulse 90 that produces a changed magnetic force in the motor represented by the force pulse 90 in the force curve of FIG. 9. As an examination of FIG. 9 indicates, when this auxiliary pulse 90 is properly timed, it almost immediately cancels the oscillation introduced by the original change in force. As a comparison of the Acceleration, Deflection and Velocity curves of FIGS. 8 and 9 indicate, the application of auxiliary pulses, such as pulse 90, can quickly and effectively eliminate unwanted vibration.

In the example of FIG. 9 the motor system was modeled such that it had a mass of 0.16 kg, a stiffness of $30.5 \times 10^6$ N/m and a Damping factor of 142 N. The force pulses had a magnitude of approximately −1500 N. For such a system the auxiliary force pulse 90 in the example of FIG. 9 begins at a point in time $80 \times 10^{-6}$ seconds after the end of the original force pulse and ends at a point in time $151 \times 10^4$ seconds after the end of the original force pulse. These values are exemplary only and are provided for purposes of illustrating the method of the present invention. The number and timing of auxiliary pulses for motor systems other that the one modeled in the example of FIG. 9 may vary significantly from the illustrative values provided herein.

Figure 10:
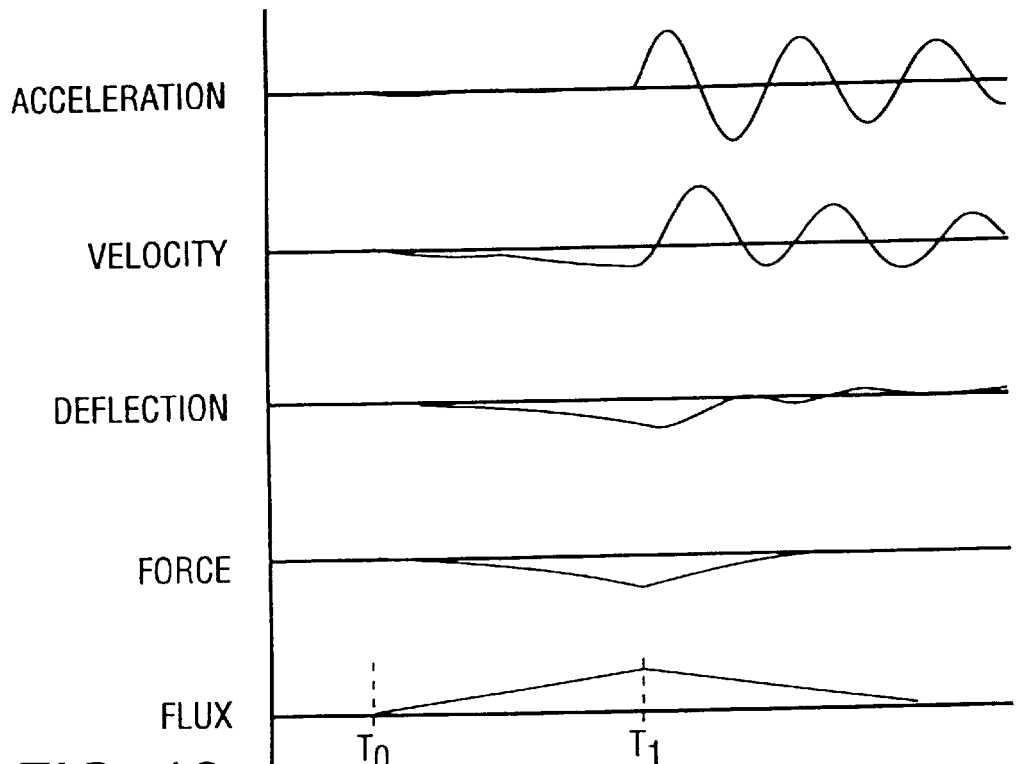
FIG. 10 generally illustrates exemplary data that resembles the forces and oscillations that would likely occur in a switched reluctance motor when an abrupt change in the gradient of the magnetic flux occurs.

FIGS. 8 and 9 illustrate an idealized, modeled, case where the auxiliary pulse is fairly rectangular. In an actual switched reluctance motor system, these forces will not be rectangular but will instead vary in a less dramatic fashion. FIG. 10 generally illustrates exemplary data that more closely resembles the forces and oscillations that would likely occur in a switched reluctance motor. In FIG. 10 a Flux curve representing the flux in the machine has been added below the Force curve.

The Flux curve in FIG. 10 illustrates the flux in the machine from the point the phase winding of interest is energized at time $T_0$, to the point where the phase winding of interest is de-energized at the switch-off point $T_1$. As illustrated in FIG. 10, after the phase winding is energized at $T_0$, the flux in the machine will begin to increase and will continue to increase until the switch-off point $T_1$ at which point the gradient of the flux will abruptly change and the flux begin to decrease. As the Force curve of FIG. 10 indicates, this abrupt change in the gradient of the flux produces a change in the forces in the motor causing the oscillation and unwanted vibration represented by the Deflection, Velocity, and Acceleration curves of FIG. 10.

Figure 11:
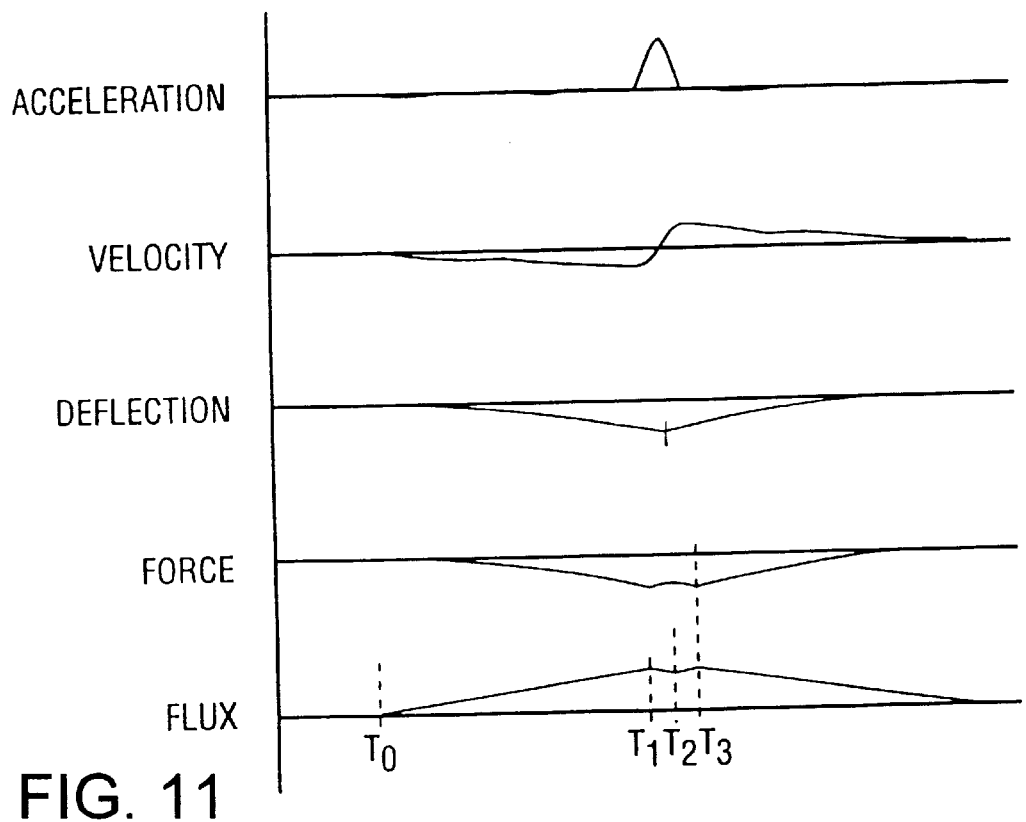
FIG. 11 illustrates the motor system of FIG. 10 when an auxiliary voltage pulse is applied in accordance with the method of the present invention.

FIG. 11 illustrates the reaction of the system whose responses are shown in FIG. 10 when an auxiliary voltage pulse is applied in accordance with the method of the present invention. As illustrated in FIG. 11, the Force and Flux curves are generally the same as for FIG. 10 up to the switch-off point $T_1$. In FIG. 11, after the switch-off point $T_1$, an auxiliary voltage pulse is applied to the phase winding in accordance with the present invention at a time $T_2$. The auxiliary voltage pulse has a duration extending from $T_2$ to $T_3$. Referring to the Flux curve of FIG. 11 it may be noted that the flux begins to decrease abruptly at point $T_1$, but then abruptly begins to increase at point $T_2$ as a result of the application of the auxiliary voltage pulse. The flux will continue to increase until point $T_3$, which corresponds to the end of the auxiliary voltage pulse. At point $T_3$, the flux again abruptly begins to decrease. The abrupt changes in the gradient of the flux resulting from the application of the auxiliary voltage pulse produce corresponding abrupt changes in the forces in the motor which tend to cancel the unwanted vibration, as indicated by the Acceleration, Velocity and Deflection curves of FIG. 11.

In the illustrative examples of FIGS. 10 and 11 the motor system is modeled to have a mass of 0.16 kg, a stiffness of $30.5 \times 10^6$ N/m, a damping factor of 142 N/m/s, and a flux linkage of $330 \times 10^3$ WbT. In the example of FIG. 11, the switch-off point occurs at a time $T_1$ that occurs $1000 \times 10^{-6}$ seconds after the phase winding is energized at time To. To produce the desired change in flux, the auxiliary voltage pulse is applied at a point $T_2$ $1085 \times 10^{-6}$ seconds after $T_0$ and terminated at a point in time $1155 \times 10^{-6}$ seconds after $T_0$. As with FIG. 9, the values for the examples of FIGS. 10 and 11 are exemplary only and are provided to clarify the method of the present invention.

While the above examples are limited to situations where a single auxiliary voltage pulses is used to reduce unwanted vibration, the method of the present invention allows for the application of multiple auxiliary pulses. As discussed above, for switched reluctance motor systems with more than one natural resonance frequency, it may be necessary to provide more than one auxiliary voltage pulse. Such multiple natural resonant frequencies may occur in asymmetrical (e.g., square or the like) machines. In general, the timing of the additional auxiliary voltage pulses may be determined using the methods set out above.

One significant advantage of using auxiliary pulses to reduce unwanted vibration is that any unwanted vibrations caused by the original hammer blow can be canceled quickly. As discussed above, a properly timed pulse can eliminate unwanted vibration rapidly, in approximately one-half of the period of the natural frequency of the machine. This quick cancellation of the unwanted pulses can be quite significant as the speed of the machine increases, and as the frequency at which the phase winding of interest is energized approaches the natural frequency or frequencies of the machine. In general, the use of auxiliary pulses in accordance with the present invention, reduces noise and unwanted vibrations much faster than known systems that use freewheeling only to reduce unwanted vibrations. Moreover, machines which have a mechanically asymmetric construction may have different natural frequencies associated with each phase of the machine. The present invention, unlike known systems, allows for the application of the appropriate auxiliary pulse for each of the phases by suitable programming of the auxiliary pulse generator.

Figure 12:
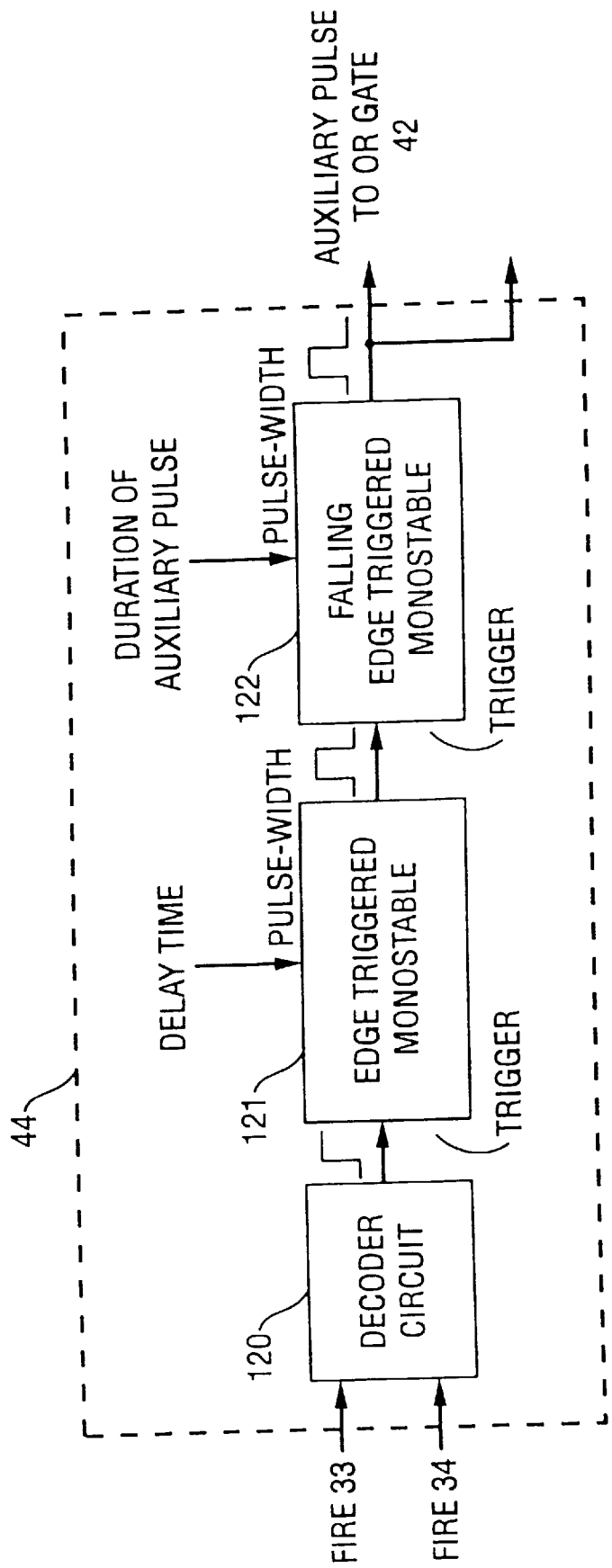
FIG. 12 illustrates in block form a circuit that may be used to construct an auxiliary controller in accordance with the present invention.

FIG. 12 illustrates in block form one example of a circuit that may be used to construct an auxiliary controller 44 to implement the method of the present invention. It will be generally understood that FIG. 12 illustrates exemplary circuitry for only one phase winding, and the circuitry would be repeated for the other phase windings, using parameter values appropriate to each phase. Control circuit 44 of FIG. 12 includes a decoder circuit 120 that receives the firing signals for the upper and lower power switching devices 33 and 34 for the phase windings corresponding to the controller. Decoder circuit 120 monitors the firing signals and produces a pulse output signal at the appropriate switch-off point. Generally the switch-off point may be detected by sensing a predefined switching event as reflected by the firing signals, e.g., the point when both the top and bottom power switched are commanded to turn OFF. The pulse produced by decoder 120 is applied to the Trigger input (T) of a first edge-triggered monostable 121. In response to a rising edge at its trigger input, edge triggered monostable 121 produces a voltage pulse that has a duration that is proportional to the signal applied to the pulse-width input of monostable 121. In the embodiment of FIG. 12, the time signal applied to the pulse-width input of monostable 121 is selected to correspond to the desired predetermined time interval between the switching event or switch-off point of interest and the initiation of the auxiliary voltage pulse.

The output of edge triggered monostable 121 is applied to the Trigger input of falling edge triggered monostable 122. Similar to edge triggered monostable 121, falling edge triggered monostable 122 produces a voltage pulse at its output in response to a falling edge appearing at its Trigger input. The duration of the pulse produced by monostable 122 is proportional to the signal that appears at its pulse-width input. In the embodiment of FIG. 12, the signal applied to the pulse-width input of monostable 122 is selected to correspond to the desired duration of the auxiliary pulse. The output of monostable 122 is split to form two outputs (for power devices 34 and 35) and is applied to the power devices through the OR gates 42, as illustrated in FIG. 4.

The auxiliary controller 44 of FIG. 12 is but one example of a circuit that may be used to implement the methods of the present invention. Other embodiments are envisioned wherein additional monostables and timers are used to implement auxiliary pulses that employ freewheeling or that provide more than one auxiliary pulses to the motor. Moreover, while FIG. 12 illustrates the use of discrete decoders, monostables and other circuits, the present invention may be implemented in a controller that uses one or more ASICs, microcontrollers or microprocessors. For example, all of the circuitry contained in the dashed box of FIG. 12 may be implemented in a single microcontroller, such as the Motorola 68HC11 through hardware and software. In such an embodiment, the on-chip timer port of the microcontroller can be programmed to act as the edge triggered monostables 121 and 122.

Figure 13:
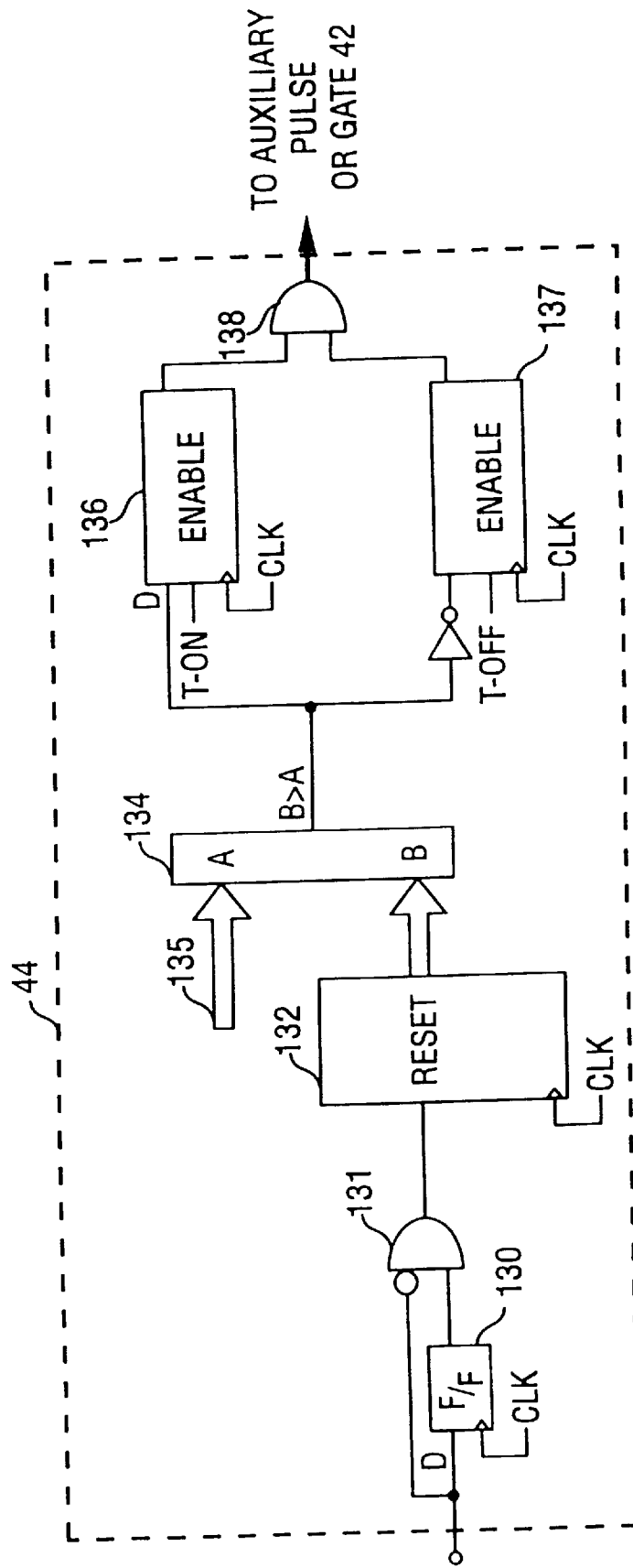
FIG. 13 illustrates alternate circuitry that may be used to implement the auxiliary controller of the present invention in clocked digital systems.

FIG. 13 illustrates alternate circuitry that may be used to implement the auxiliary controller 44 of FIG. 4 in clocked digital systems. As with FIG. 12, FIG. 13 illustrates the controller for a single phase. It is to be understood that in multi-phase systems the control circuitry of FIG. 13 would be repeated for each phase, using appropriate parameter values.

In general, the circuitry of FIG. 13 includes a first clocked flip-flop 130 that receives at its data input a signal that corresponds to the normal firing signals for the phase of interest. The signal corresponding to the firing signal (which may be the firing signal or a phase select signal) is provided by controller 40 (not shown) and is selected such that when it is logic 1, the corresponding phase winding is energized and when it is logic 0, the phase winding is de-energized. Accordingly, the point at which the signal transitions from logic 1 to logic 0 represents the switch-off point of interest to the present invention.

The signal corresponding to the firing signal is inverted and applied to one input of two-input AND gate 131. The other input of AND gate 131 receives the Q output of flip-flop 130. As those skilled in the art will recognize, flip-flop 130 and AND gate 131 operate together to produce a rising edge pulse at the output of AND gate 131 each time the signal corresponding to the firing signal transitions from logic 1 to logic 0. The output of AND gate 131 is applied to the RESET input of an 8-bit up counter 132. Accordingly, 8-bit up counter 132 is reset and begins a new count each time the signal corresponding to the firing signal transitions from logic 1 to logic 0 (i.e., at each switch-off point of interest).

The 8-bit output of counter 132 is provided to the B input of an 8-bit magnitude comparator 134. The A input to magnitude comparator receives an 8-bit data bus 135 that carries firing information provided to the auxiliary controller by the controller 40. The B>A output of comparator 134 is applied as the data input to a first clocked D flip-flop 136. The B>A output of comparator 134 is also inverted and the inverted signal is applied to the input of a second clocked D flip-flop 137. The control input to flip-flop 136 is coupled to a line carrying a T-ON signal. The control input to flip-flop 137 is coupled to a line carrying a T-OFF signal. As discussed below, the T-ON and T-OFF signals change in response to the type of data carried on bus 135. The outputs of flip-flops 136 and 137 are coupled to the inputs of an AND gate 138. In operation, the flip-flops 136 and 137 function as de-multiplexes to select which data will control the output state of AND gate 138. The output of AND gate 138 represents the firing signal for the auxiliary pulse. It may be separated into two signals and applied to the inputs to the appropriate auxiliary pulse OR gates 42 of FIG. 4.

At or after the termination of the firing pulse, the controller 40 (or a separate auxiliary pulse control circuit) places an eight-bit digital word on data bus 135 that corresponds to the turn-on time for the auxiliary voltage pulse. At or after the controller places the turn-on information on data bus 135, it asserts the T-ON signal, thus enabling flip-flop 136. At this time, the T-OFF signal is a logic low, disabling flip-flop 137.

At the time flip-flop 136 is enabled, the output of flip-flop 137 is a logic 1 and the output of flip-flop 136 is logic 0. Since flip-flop 137 is disabled at this time (T-OFF is low) the output of flip-flop 137 will remain low. Because flip-flop 136 is enabled, its output will follow its data input which is the B>A output of comparator 134. At the time the turn-on information is placed on data bus 135, the output count of counter 132 will be less than the digital word that corresponds to the turn-on time for the auxiliary pulse. Accordingly, the B>A output from comparator 134, and thus the output of flip-flop 136 and AND gate 138, will be logic low. As the count from counter 132 increases over time, a point will be reached where the count exceeds the digital word on line 135 corresponding to the turn-on time for the auxiliary pulse. At that time, the B>A output of comparator 134 will rise to logic high, as will the output of flip-flop 136 and AND gate 138. This will initiate a firing signal that will initiate the auxiliary pulse.

Sometime after the auxiliary pulse is initiated in the manner described above, the controller 40 places a digital word on bus 135 that corresponds to the turnoff time for the auxiliary pulse. At that time, the controller de-asserts the T-ON signal and asserts the T-OFF signal. When this occurs, flip-flop 136 (with a logic high output) is disabled and flip-flop 137 is enabled. Since at the time the T-OFF signal is asserted the count output from counter 132 will be less than the T-OFF data word on bus 135, the inverted B>A output of comparator 134 (and thus the output of flip-flop 137) will remain logic high. Accordingly, the output of AND gate 138 will also remain logic high and the auxiliary firing pulse will continue. The inverted B>A input will remain logic high until the output count from counter 132 exceeds the digital word on bus 135. At that time, the inverted B>A output of counter 134 will drop to logic low, as will the output of flip-flop 137 and gate 138. This change in the output of AND gate 138 will terminate the auxiliary firing pulse.

The specific circuitry of FIG. 13 is provided as only one possible example of one type of clocked circuit that may be used to implement the present invention. Other types of circuits, possibly using additional comparators, may also be used to implement the control circuit of the present invention.

While the above discussion of the use of auxiliary pulses for noise reduction was in the context of a reluctance machines operating as a motors, the present invention is also applicable to machines acting as generators. For generators the application and timing of the auxiliary pulses must be modified. For example, for generators, it is the front end of the flux waveform that should be modified through the application of the auxiliary pulses. Accordingly, the auxiliary pulses should disconnect the phase winding from the DC bus and should follow the peak of the flux waveform by an appropriate predetermined period of time.

In addition to the use of auxiliary pulses to reduce the amount of noise produced by a switched reluctance motor system through active canceling of unwanted vibrations, the present invention also contemplates embodiments where noise is reduced by effectively "rounding" the sharp corners of the flux waveform. This rounding of the flux waveform causes the flux changes in the motor to be less abrupt and reduces the severity of the resultant vibrations. In the embodiments of the present invention described below, the edges of the flux waveform are rounded or "softened" by controlling the transition of the voltage across the phase windings of the motor from a first voltage level to a second voltage level. This control allows the voltage across the phase winding to change smoothly from the DC bus voltage to the negative of the DC bus voltage over time. This embodiment provides for a smooth voltage transition as opposed to the abrupt voltage transition from +V bus to −V bus as illustrated in FIG. 5A.

In one embodiment of the present invention, the smoothing of the transition of the voltage applied to the phase winding from +V to −V is accomplished through the application of a succession of timed voltage pulses to the phase winding after the switch-off point of interest. This succession of timed voltage pulses smoothly adjusts the effective mean voltage applied to the phase winding over a given period of time, as opposed to over a given rotor angle.

Figure 14A:
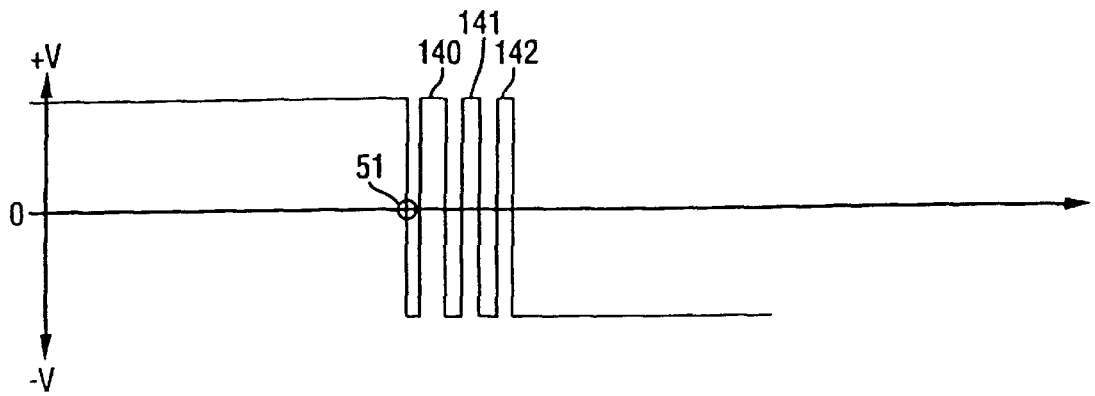
FIG. 14A generally illustrates the termination of a voltage pulse at a switch-off point and the application of a succession of timed voltage pulses following the switch-off point in accordance with the present invention.
Figure 14B:
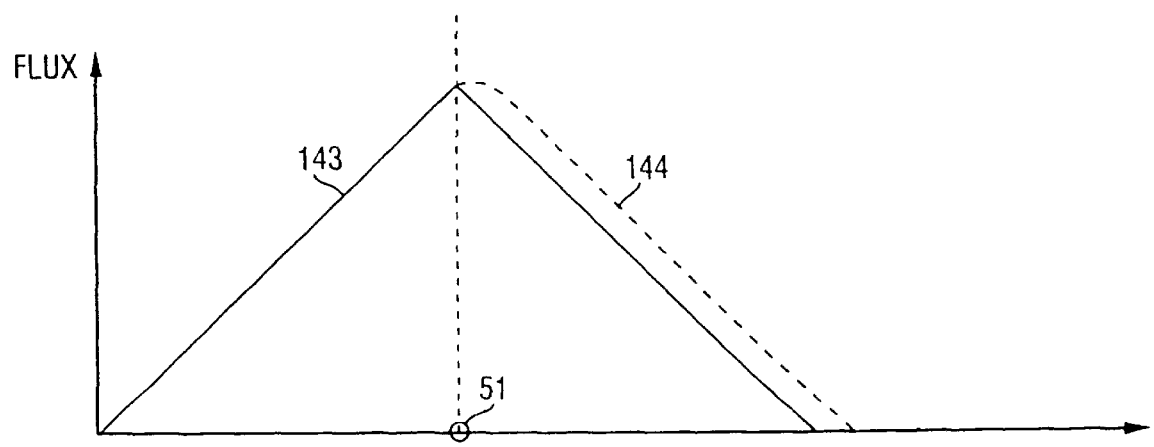
FIG. 14B provides a general illustration of the effect of the application of the succession of timed voltage pulses from FIG. 14A on the flux of a switched reluctance motor.

An example of the application of a succession of timed voltage pulses to smoothly adjust the effective mean voltage applied to the phase winding of a switched reluctance motor over time is illustrated in FIGS. 14A and 14B. FIG. 14A generally illustrates the termination of an angular period of phase energization at switch-off point 51 and the application of a succession of timed voltage pulses 140, 141 and 142 at a predetermined point in time following the switch-off point. In the embodiment of FIG. 14A, the width of the pulses decreases such that the width of pulse 141 is less than the width of pulse 140, and the width of pulse 142 is less than the width of pulse 141. This "ramping down" of the pulse width further smoothes the change in the mean voltage applied to the phase winding. Although the example of FIG. 14A illustrates the application of three decreasing width pulses after the switch-off point, embodiments are envisioned where a different number of pulses (e.g., 5–10) are applied to the phase winding and where the pulse width does not vary according to the example of FIG. 14A. Generally, the number of additional smoothing pulses can be determined by modifying the number of pulses applied to the motor and empirically determining the number of additional smoothing pulses that produce the desired reduction in noise and vibration. Moreover, embodiments are envisioned where freewheeling periods are introduced in between the pulses comprising the succession of timed pulses.

The succession of timed pulses that are applied to the phase winding in accordance with the present invention may be provided by additional circuitry for each phase that is specially designed and pre-programmed to apply a succession of timed pulses at the appropriate predetermined point in time. Alternately, existing chopping mode control circuitry may be used to provide the controlled burst of pulses. When chopping mode circuitry is used, the succession of timed pulses may be generated by ramping down the reference current signal applied to the chopping mode controller as a function of time after the switch-off point of interest.

FIG. 14B provides a general illustration of the effect of the controlled burst of pulses on the flux waveform. The solid line 143 reflects the motor flux without the application of the succession of timed pulses. As illustrated, at the conclusion of an angular period of phase energization indicated by switch-off point 51 there is an abrupt change in the gradient of the flux, which may produce unwanted noise and vibration as discussed above. Dashed line 144 generally illustrates the motor flux with the application of the succession of timed pulses. As indicated the change in the flux at the switch-off point 51 is less abrupt resulting in reduced vibration and noise.

Typically, when a succession of timed pulses is used to reduce vibration and noise, the number of pulses and their respective widths may be determined empirically. In general, however, by varying the width of the pulses it is possible to profile the flux gradient in a manner akin to the use of pulse width modulation to control the change of current in an inductive load.

Figure 15A:
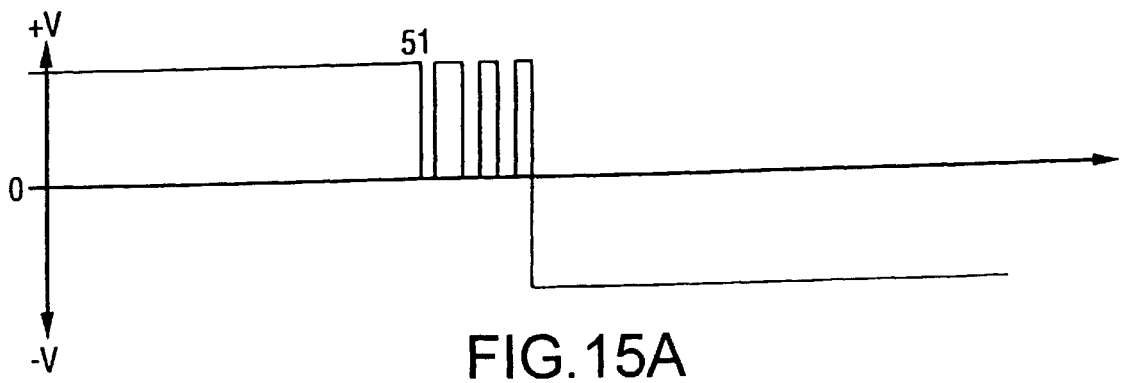
FIG. 15A illustrates an exemplary succession of timed voltage pulses in accordance with the present invention where the voltage pulses that comprise the succession vary in magnitude from +V to 0.
Figure 15B:
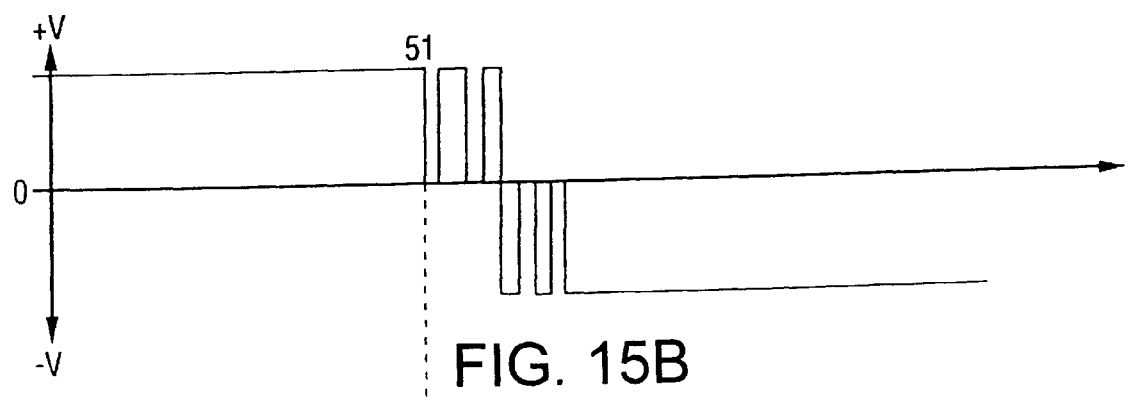
FIG. 15B illustrates a exemplary succession of timed voltage pulses in accordance with the present invention wherein the voltage pulses that comprise the succession vary from +V to 0 during a first part of the succession and from 0 to −V during a second part of the succession.

In the example of FIG. 14A, the succession of timed pulses includes pulses that vary from a +V voltage to a −V voltage. To provide such voltage pulses both the upper and lower switching devices for the winding should be switched on (to provide a +V voltage) and switched off (to provide a −V voltage.) Alternate embodiments of the present invention are envisioned wherein the upper and lower switching devices are switched on or off at different times to provide a controlled succession of timed pulses where the pulses vary from voltages other than +V to −V. FIGS. 15A–15B illustrate examples of such alternate embodiments.

FIG. 15A illustrates an exemplary succession of voltage pulses following switch-off point 51 where the pulses that comprise the succession vary in magnitude from +V to 0. Such voltage pulses may be generated by leaving the lower switching device (i.e., the one coupling the phase winding to the lower rail of the DC bus) switched on and switching the upper power device to provide the voltage pulses. During the period when the lower device is switched on and the upper device is switched off, the current will freewheel through the lower device and the voltage across the phase winding will be approximately 0 volts.

FIG. 15B illustrates yet another exemplary succession of voltage pulses wherein the pulses vary from −V to 0 volts during a first part of the succession and from 0 to −V during a second part of the succession. The +V to 0 pulses may be generated in the manner described above. The 0 to −V pulses may be generated by switching off the upper power device and switching on and off the lower switching device to provide the pulses.

It should be noted that the successions illustrated in FIGS. 15A and 15B are provided by way of example. Other controlled successions including combinations of pulses from +V to −V, +V to 0 and 0 to −V may be used to soften the reversal of the effective mean voltage applied to the phase winding in accordance with the present invention.

The application of the succession of rapid pulses in accordance with the present invention is different from the application of voltage pulses that occurs in typical motoring operation. As discussed above, the voltage pulses applied during typical motoring operation are defined by the rotor's movement from an angular position corresponding to the turn-ON angle to an angular position corresponding to the turn-OFF or commutation angle. Generally, as the rotor increases in angular speed, it will rotate through these angles faster, resulting in a time shortening of the applied voltage pulses as the motor speed increases. Because the duration of these pulses is defined by the angular position of the rotor, they are referred to angle-defined pulses.

In contrast to angle-defined pulses, the voltage pulses that comprise the succession of timed pulses provided in accordance with the present invention are time defined. Thus, unlike the pulses which are defined by the angle of the rotor, the rapid succession of timed pulses of the present invention occur over a given time period. For example, in one embodiment of the present invention the same number of voltage pulses will occur at the same time following each switch-off point of interest, regardless of the angular speed of the rotor or the angular position at which switch-off occurs.

Alternate embodiments are envisioned wherein capacitors and other active devices are used to smooth the actual voltage applied to the phase windings at the switch-off point. Unlike the embodiment where a controlled burst of pulses is used to smooth the effective mean voltage applied to the windings, in such alternate embodiments, the actual voltage applied to the windings is smoothed.

Figure 16:
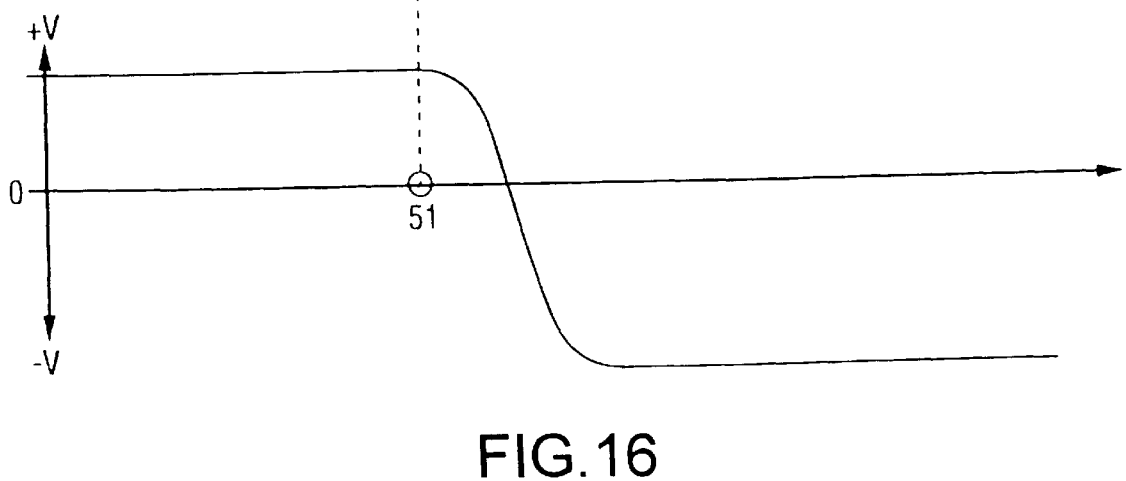
FIG. 16 generally illustrates an ideal smooth voltage reversal of the voltage across a phase winding from +V to −V.

FIG. 16 generally illustrates an ideal smooth voltage reversal from +V to −V of the voltage across a phase winding. This ideal voltage may be approximated through the use of the circuitry illustrated in FIG. 17A.

Figure 17A:
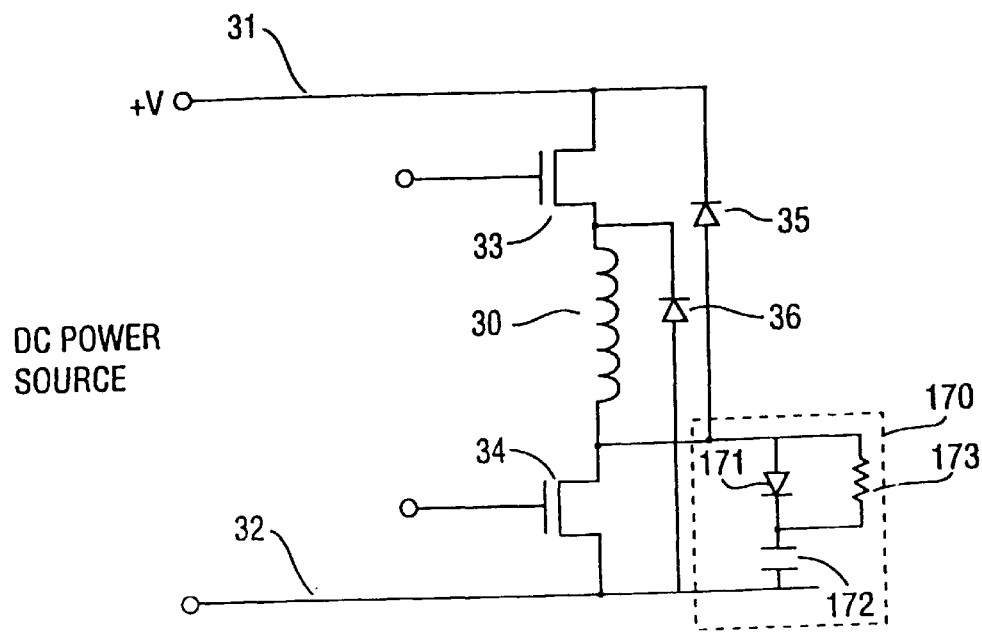
FIG. 17A generally illustrates the use of a capacitor smoothing circuit associated with a single switching device to soften the voltage reversal across a phase winding in accordance with the present invention.

FIG. 17A generally illustrates the use of a capacitor smoothing circuit to soften the voltage reversal. In FIG. 17A, a smoothing circuit 170 has been added around one switching device of a two switching device switching arrangement similar to that discussed above in connection with FIG. 3. Return diodes 35 and 36 are also provided. Return diode 36 has an anode coupled to the negative rail 32 of the DC bus and a cathode coupled to a first terminal of phase winding 30. Return diode 35 has an anode coupled to a second terminal of the phase winding and a cathode coupled to the positive rail 31 of the DC bus.

In the embodiment of FIG. 17A, capacitor smoothing circuit 170 is coupled between the second terminal of phase winding 30 where return diode 35 couples with the phase winding, and a point corresponding to the negative DC bus rail. The capacitor smoothing circuit 170 includes a diode 171, a capacitor 172 and a resistor 173. The capacitor 172 in the capacitor smoothing circuit 170 is much larger than a capacitor would be in a conventional snuffer, such as snubbers used to control the transient voltage across a switching device. This is because, in the present invention, the main function of smoothing circuit 170 is not to control the switch voltage but to smooth the reversal of the voltage applied to the phase winding. The precise magnitudes of the resistor 173 and capacitor 172 will vary with the size and power rating of the motor. In general, the capacitor 172 should be sized to control the transition of the voltage across the phase winding from 0 volts to the negative of the DC bus voltage over a given period of time when the phase winding is de-energized.

Figure 17B:
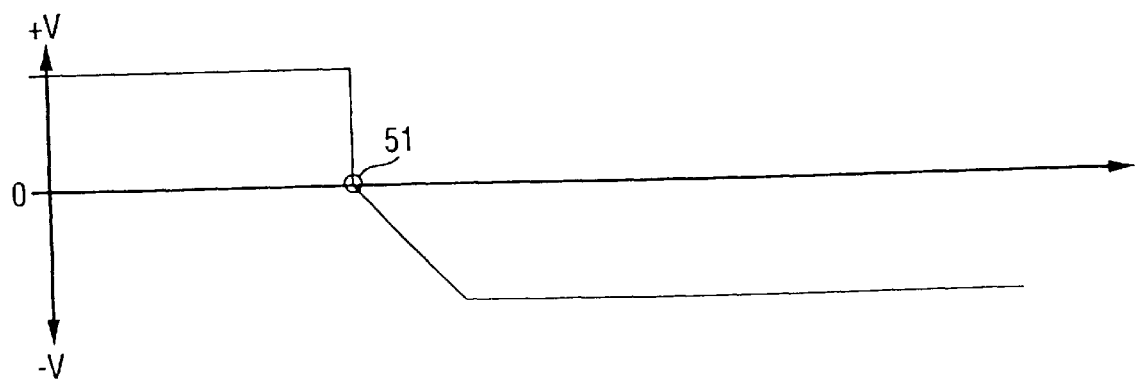
FIG. 17B generally illustrates the voltage across to the phase winding when the capacitor smoothing circuit of FIG. 17A is employed.

FIG. 17B generally illustrates the voltage across the phase winding 30 when the circuitry of FIG. 17A is employed. Initially, switches 33 and 34 are both closed and the voltage across the winding 30 is +V. During this period of time, because switch 34 is closed, the voltage across the capacitor 172 will be approximately zero volts. At switch-off point 51, both switching devices 33 and 34 are opened, and the voltage applied to the phase winding will abruptly change from +V to 0. The phase current then flowing in the phase winding 30 will commutate into the capacitor 172 through diodes 36 and 171. This current flow will begin to charge capacitor 172, and the voltage across capacitor 172 will rise in a roughly linear fashion towards +V. Accordingly, the voltage applied to the phase winding will ramp down in a roughly linear fashion towards −V as the voltage across capacitor 172 gradually rises to +V.

It should be noted that the switching approach discussed in the example of FIGS. 17A and 17B is but one example with the switching approach that may be used in connection with the present invention. Alternate embodiments are envisioned wherein other switching approaches are utilized. For example, embodiments are envisioned where at the initial switch off point 51 only the upper device 33 is opened and the current is allowed to freewheel through diode 36 and switching device 34 before switch 34 is opened.

Figure 18A:
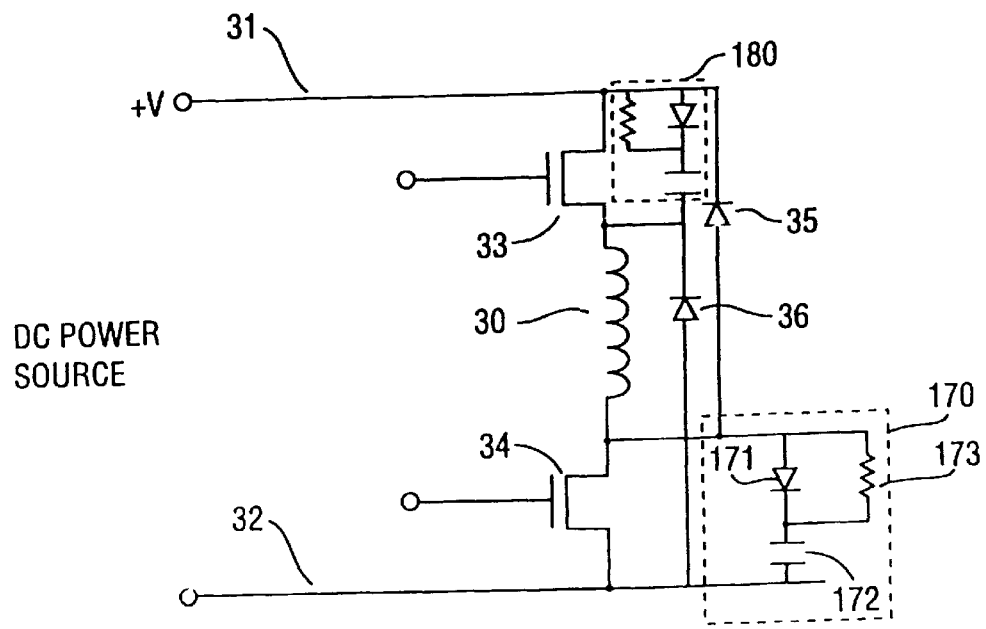
FIG. 18A illustrates an alternate embodiment of the capacitor circuit of FIG. 17A wherein a capacitor smoothing circuit is associated with both upper and lower switching devices to soften the voltage reversal across a phase winding in accordance with the present invention.
Figure 18B:
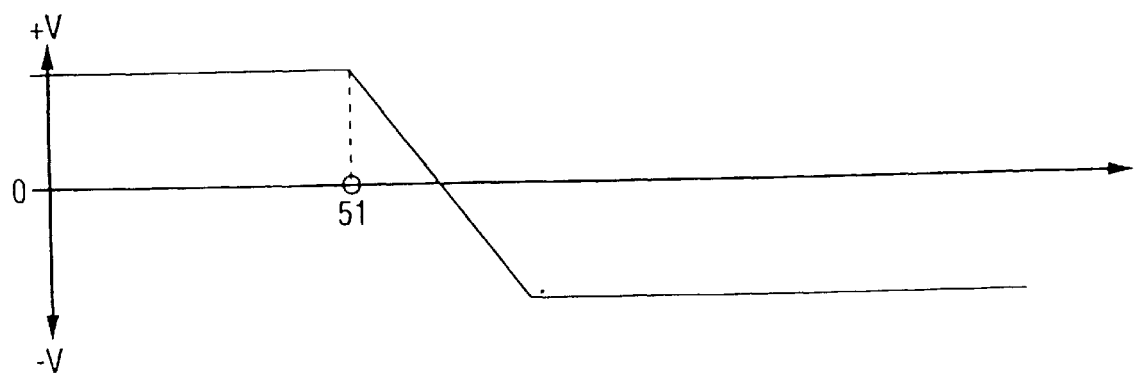
FIG. 18B generally illustrates the voltage across the phase winding when the capacitor smoothing circuitry of FIG. 18A is used.

While the use of the circuitry of FIG. 17A tends to soften the voltage reversal, it still allows for an abrupt change in voltage from +V to 0 at the switch-off point. A still further embodiment is envisioned wherein two capacitor smoothing circuits (one for each switching device) are used for each phase winding. Such an arrangement is illustrated in FIG. 18A, where a capacitor smoothing circuit 180 is associated with upper switching device 33 and a capacitor smoothing circuit 170 is associated with lower switching device 34. The smoothing circuit 180 operates in a manner similar to smoothing circuit 170, but ramps the voltage at switch-off from a +V voltage to 0 volts as the voltage across the smoothing capacitor associated with smoothing circuit 180 discharges from +V to 0 volts. In this embodiment capacitor smoothing circuit 170 operates as previously described. FIG. 18B generally illustrates the voltage across the phase winding 30 when the circuitry of FIG. 18A is used.

In effect the converter of the present invention causes the transition time of the voltage switched across the phase winding to be increased so that the rate of change of flux linkage in the phase winding is reduced, such that the distorting forces imposed on the stator are reduced. This reduces the acoustic noise from, and vibration in the stator.

Although snubber circuits have been used in the past to reduce switching losses, the present invention contemplates the use of components creating a longer transition time, such as a much larger capacitor and the use of the particular switching arrangements discussed above. While the known snubber circuits are designed to limit the effect of the voltage spike on the switch itself, the inventor has recognized that a greater transition time in the control of switched reluctance machines is actually beneficial in reducing the distorting forces imposed on the machine stator. This is contrary to the well established thinking on why, and to what extent, a circuit designer should increase the transition time to have a beneficial effect.

Preferably, the transition time of a converter according to the invention is of the order of 10 microseconds or more.

The actual time will be a compromise between the alleviation of the distorting forces imposed on the stator and the switching time available according to the machine design and operating requirements.

The parameters of the smoothing circuit of the present invention differ significantly from the parameters of known snubber circuits and should be selected such that the ramp-down time of the phase voltage drops over a preselected time interval, where the duration of the time interval is sufficiently extended and selected to decrease the amount of unwanted noise and vibration produced by the machine.

Embodiments are envisioned wherein the active canceling of noise through the use of auxiliary pulses is combined with the described techniques for smoothing the voltage transitions to provide further benefit in the context of noise reduction.

The above description of several embodiments is made by way of example and not for purposes of limitation. Many variations may be made to the embodiments disclosed herein without departing from the scope and spirit of the present invention. For example, while the above description was directed primarily to specific switched reluctance motor systems, the present invention is applicable to any form of reluctance machine, regardless of the number of poles, pole shape and general layout. The present invention is intended to be limited only by the spirit and scope of the following claims.

What is claimed is:

1. A converter for a switched reluctance machine including at least one phase winding, the phase winding having a first terminal and a second terminal, the converter comprising:

a DC bus comprising a positive rail and a negative rail;

a first switching device coupled to the positive rail of the DC bus and to the first terminal of the phase winding, the first switching device switchable to couple and de-couple the first terminal of the phase winding to the positive rail of the DC bus;

a second switching device coupled to the negative rail of the DC bus and to the second terminal of the phase winding, the second switching device switchable to couple and de-couple the second terminal of the phase winding to the negative rail of the DC bus;

a first diode having an anode and a cathode, wherein the anode of the first diode is coupled to the negative rail of the DC bus and wherein the cathode of the first diode is coupled to the first terminal of the phase winding;

a second diode having an anode and a cathode, wherein the anode of the second diode is coupled to the second terminal of the phase winding and where the cathode of the first diode is coupled to the positive rail of the DC bus;

a first capacitor smoothing circuit comprising:

a third diode having an anode and a cathode, wherein the anode of the third diode is coupled to the positive rail of the DC bus;

a first resistor having a first terminal coupled to the anode of the third diode and a second terminal coupled to the cathode of the third diode; and a first smoothing capacitor having a first terminal coupled to the cathode of the third diode and a second terminal coupled to the first terminal of the phase winding, wherein the first smoothing capacitor is sized to control the transition of the voltage across the phase winding from a first voltage level to a second voltage level when both the first and the second switching devices are switched off; and a second capacitor smoothing circuit comprising:
a fourth diode having an anode and a cathode, wherein the anode of the fourth diode is coupled to the second terminal of the phase winding;
a second resistor having a first terminal coupled to the anode of the fourth diode and a second terminal coupled to the cathode of the fourth diode; and
a second smoothing capacitor having a first terminal coupled to the cathode of the fourth diode and a second terminal coupled to the negative rail of the DC bus, wherein the second smoothing capacitor is sized to control the transition of the voltage across the phase winding from the second voltage level to a third voltage level when both the first and the second switching devices are switched off.

2. The reduced noise converter of claim 1 wherein the voltage across the DC bus is +V volts, wherein the first voltage level is approximately +V volts and wherein the second voltage level is approximately 0 volts.

3. The reduced noise converter of claim 2 wherein the third voltage level is approximately −V volts.

4. The reduced noise controller of claim 2 wherein the first smoothing capacitor is sized such that the transition of the voltage across the phase winding from approximately +V volts to 0 volts occurs in a substantially linear fashion over time.

5. The reduced noise controller of claim 2 wherein the second smoothing capacitor is sized such that the transition of the voltage across the phase winding from approximately 0 volts to −V volts occurs in a substantially linear fashion over time.

6. A reduced noise converter for a switched reluctance machine including at least one phase winding having a first terminal and a second terminal, the converter comprising:
a DC bus comprising a positive rail and a negative rail;
a first switching device coupled to the positive rail of the DC bus and to the first terminal of the phase winding, the first switching device switchable to couple and de-couple the first terminal of the phase winding to the positive rail of the DC bus;
a second switching device coupled to the negative rail of the DC bus and to the second terminal of the phase winding, the first switching device switchable to couple and de-couple the second terminal of the phase winding to the negative rail of the DC bus;
a first diode having an anode and a cathode, wherein the anode of the first diode is coupled to the negative rail of the DC bus and where the cathode of the first diode is coupled to the first terminal of the phase winding;
a second diode having an anode and a cathode, wherein the anode of the second diode is coupled to the second terminal of the phase winding and where the cathode of the first diode is coupled to the positive rail of the DC bus;
a third diode having an anode and a cathode, wherein the anode of the third diode is coupled to the second terminal of the phase winding;
a resistor having a first terminal coupled to the anode of the third diode and a second terminal coupled to the cathode of the third diode; and
a smoothing capacitor having a first terminal coupled to the cathode of the third diode and a second terminal coupled to the negative rail of the DC bus, wherein the capacitor is sized to control the transition of the voltage across the phase winding from a first voltage level to a second voltage level when both the first and the second switching devices are switched to de-couple the first and second terminals of the phase winding from the positive and negative rails of the DC bus.

7. The converter of claim 1 wherein the voltage across the DC bus is V volts, wherein the first voltage level is 0 volts and wherein the second voltage level is −V volts.

8. A method of reducing vibrations in a switched reluctance machine system, the switched reluctance machine system including a switched reluctance machine having a rotor and a stator, the stator including at least one phase winding, and a controller for energizing the phase winding over an angular period of rotor rotation to produce a desired output torque, the method comprising the steps of:
energizing the phase winding over an angular period to produce the desired torque output, the angular period having a conclusion corresponding to an angular position of the rotor; and
at the conclusion of the angular period, applying a succession of timed voltage pulses to the phase winding wherein each voltage pulse applies positive voltage to the phase winding for a defined period of time and wherein each voltage pulse is initiated at a predetermined time after the conclusion and terminated at a predetermined point in time after the conclusion, such that the succession of voltage pulses controls a transition of the voltage across the phase winding from a first voltage level to a second voltage level over a fixed period of time.

9. The method of claim 8 wherein the step of applying a succession of timed voltage pulses to the phase winding comprises the step of applying a series of consecutive voltage pulses to the phase winding, where the pulse widths of the consecutive voltage pulses decrease over time.

10. The method of claim 8 wherein the step of applying a succession of timed voltage pulses comprises the step of applying between three and ten timed voltage pulses to the phase winding.

11. The method of claim 8 wherein the phase winding is energized from a DC bus having a voltage of +V and wherein the step of applying a succession of timed voltage pulse comprises the step of applying a plurality of voltage pulses to the phase winding where the pulses vary from +V volts to −V volts.

12. The method of claim 8 wherein the phase winding is energized from a DC bus having a voltage of +V and wherein the step of applying a succession of timed voltage pulse comprises the steps of:
applying a first plurality of voltage pulses to the phase winding where the voltage pulses in the first plurality vary from +V volts to 0 volts; and
applying a second plurality of voltage pulses to the phase winding where the voltage pulses in the second plurality vary from 0 volts to −V volts.

13. The method of claim 8 wherein the phase winding is energized from a DC bus having a voltage of +V and the step of applying a succession of timed voltage pulses to the phase winding controls the transition of the voltage across the phase winding from +V volts to −V volts over a fixed period of time.

14. A method of reducing vibration in a switched reluctance machine, the machine including a rotor and a stator, the stator having a phase winding that is energized over an angular period of rotation of the rotor, the method comprising the steps of:
energizing the phase winding over the angular period to produce a desired machine output; and at the conclusion of the angular period, controlling the application of phase winding excitation such that a mean voltage is established across the phase winding that varies over a fixed period of time from a first voltage level to a second voltage level.

15. The method of claim 14 wherein the step of controlling the application of phase winding excitation such that the mean voltage across the phase winding varies over a fixed period of time from a first voltage level to a second voltage level comprises the step of applying a succession of pulse width modulated voltage pulses to the phase winding.

16. The method of claim 15 wherein the succession of pulse width modulated pulses comprises a plurality of consecutive pulses of decreasing pulse width.

17. A switched reluctance machine system comprising:
a switched reluctance machine having a stator, at least one phase winding associated with the stator, and a rotor rotatably positioned with respect to the stator, wherein energization of the phase winding produces a desired machine output;
an electronic controller coupled to the phase winding and to a source of electric power, the controller energizing the phase winding in response to the angular position of the rotor with respect to the stator by coupling the phase winding to the source of electric power when the rotor reaches a first angular position and de-coupling the phase winding from the source of electric power when the rotor reaches a second angular position; and
circuitry for applying a succession of voltage pulses to the phase winding, the succession of voltage pulses beginning after a fixed interval of time has passed after the rotor reaches the second angular position, wherein the succession of voltage pulses includes voltage pulses that apply a positive voltage to the phase winding, the succession of voltage pulses controlling the transition of the voltage across the phase winding from a first voltage level to a second voltage level.

18. The system of claim 17 wherein the circuitry for applying a succession of voltage pulses to the phase winding comprises a chopper circuit that controls the energization of the phase winding in response to a reference current command.

19. The system of claim 18 further comprising means for ramping down the reference current command applied to the chopper circuit over a fixed period of time following the rotor's reaching the second angular position.

20. A control system for a reluctance machine including a rotor, a stator and at least one phase winding where a voltage is established across the phase winding, the system comprising, (i) control means operable to produce firing signals, (ii) switch means, the switch means defining at least two conduction states, wherein one of the conduction states results in the application of positive voltage to the phase winding, the switch means being responsive to the firing signals to change the conduction of the switch means from one conduction state to another conduction state to reverse the voltage across the phase winding where the reversal of voltage occurs over a transition time and according to a rate of change, and (iii) damping means operably connected with the switch means to increase the transition time of the voltage reversal across the phase winding, thereby reducing the rate of change of magnetic flux linking the phase winding such that distorting forces imposed on the stator are reduced, the damping means being arranged to actuate the switch means between the one and the other conduction states repeatedly following a firing signal from the control means to cause the voltage across the phase winding to change according to the increased transition time.

21. A system as claimed in claim 20 in which the transition time is greater than 10 microseconds.

22. A system as claimed in claim 20 in which the damping means are operable to change the switch means from the one state to the other state according to a decreasing duty cycle.

23. A system as claimed in claim 20 in which the switch means comprise a first switching device arranged to enable conduction between one power conductor and one end of the phase winding; a second switching device arranged to enable conduction between another power conductor and the other end of the phase winding; a first unidirectional current device connected to conduct from the other conductor to the one end of the phase winding; a second unidirectional current device connected to conduct from the other end of the phase winding to the one conductor; a first smoothing circuit connected across the first switch; a second smoothing circuit connected across the second switch, the first and second smoothing circuits being operable to control the transition of voltage across the phase winding according to the increased transition time.

24. A system as claimed in claim 23 in which the first smoothing circuit comprises a third uni-directional current device connected at one terminal to conduct from the one conductor; a first resistor connected across the third unidirectional current device; a first smoothing capacitor coupled between the other terminal of the third unidirectional current device and the one end of the phase winding, wherein the first smoothing capacitor increases the transition time of the voltage reversal across the phase winding when both the first and second switch devices are non-conducting; a second smoothing circuit comprising a fourth unidirectional current device connected to conduct toward the other conductor; a second resistor connected across the fourth unidirectional current device; and a second smoothing capacitor connected between the other terminal of the fourth unidirectional current device and the other conductor wherein the second smoothing capacitor increases the transition time of the voltage reversal across the phase winding when both the first and second switch devices are non-conducting.

25. A control system for a reluctance machine including a rotor, a stator and at least one phase winding, the system comprising control means operable to produce firing signals, switch means responsive to the firing signals to change the conduction of the switch means from one state to another state to reverse the voltage across the phase winding, and damping means comprising a damping circuit connected across at least part of the switch means for increasing the transition time of the voltage reversal across the phase winding, thereby reducing the rate of change of magnetic flux linking the phase winding such that distorting forces imposed on the stator are reduced wherein the switch means comprise a first switching device arranged to enable conduction between one power conductor and one end of the phase winding; a second switching device arranged to enable conduction between another power conductor and the other end of the phase winding; and a unidirectional current device connected to conduct from the other end of the phase winding; and wherein the damping means comprise a first smoothing circuit connected across the first switch, the first smoothing circuit being operable to control the transition of voltage across the phase winding according to the increased transition time.

26. A system as claimed in claim 25 in which the first smoothing circuit comprises a further unidirectional current device connected at one terminal to conduct from the one conductor, a first resistor connected across the third unidirectional current device; a first smoothing capacitor coupled between the other terminal of the further unidirectional current device and the one end of the phase winding, wherein the first smoothing capacitor increases the transition time of the voltage reversal across the phase winding when both the first and second switch devices are non-conducting.

27. A method of reducing vibration in a reluctance machine having a rotor, a stator and at least one phase winding and switch means connected across the phase winding, the switch means defining at least two conduction states wherein one of the conduction states results in the application of positive voltage to the phase winding the method comprising:

actuating the switch means to change the conduction of the switch means from one conduction state to another conduction state to reverse the voltage across the phase winding over a transition time and according to a rate of change; and a step of damping the switch means to increase the transition time of the voltage reversal across the phase winding, thereby reducing the rate of change of magnetic flux linking the phase winding such that distorting forces imposed of the stator are reduced, wherein-the step of damping includes the step of actuating the switch means to change states between the one and the other conduction states repeatedly in accordance with damping pulses following a firing signal from the control means to cause the voltage across the phase winding to change according to the increased transition time.

28. A method as claimed in claim 27 in which the transition time is damped to greater than 10 microseconds.

29. A method as claimed in claim 27 in which the damping pulses have a decreasing duty cycle.

* * * * *